(12) United States Patent
Järvinen et al.

(10) Patent No.: US 12,503,421 B2
(45) Date of Patent: Dec. 23, 2025

(54) METHODS FOR RECOVERING ORGANIC ACIDS OR SALTS OR LACTONES THEREOF FROM AQUEOUS SOLUTIONS USING WATER SOLVENT CRYSTALLIZATION AND COMPOSITIONS THEREOF

(71) Applicant: DANISCO US INC., Palo Alto, CA (US)

(72) Inventors: Juho Järvinen, Kantvik (FI); Hannu Koivikko, Kantvik (FI); Jyrki Kuusisto, Vantaa (FI); Tero Tuomas Mentunen, Kantvik (FI); Juha Nurmi, Kantvik (FI); Pertti Matias Särelä, Kantvik (FI); Jani Siitonen, Kantvik (FI); Gregory M. Whited, Palo Alto, CA (US)

(73) Assignee: Danisco US Inc., Palo Alto, CA (US)

( * ) Notice: Subject to any disclaimer, the term of this patent is extended or adjusted under 35 U.S.C. 154(b) by 824 days.

(21) Appl. No.: 17/634,600

(22) PCT Filed: Aug. 25, 2020

(86) PCT No.: PCT/US2020/047715
§ 371 (c)(1),
(2) Date: Feb. 11, 2022

(87) PCT Pub. No.: WO2021/041361
PCT Pub. Date: Mar. 4, 2021

(65) Prior Publication Data
US 2022/0324786 A1    Oct. 13, 2022

Related U.S. Application Data

(60) Provisional application No. 62/892,760, filed on Aug. 28, 2019, provisional application No. 63/012,492, filed on Apr. 20, 2020.

(51) Int. Cl.
*C07C 51/43* (2006.01)
*C12N 1/20* (2006.01)

(52) U.S. Cl.
CPC .............. *C07C 51/43* (2013.01); *C12N 1/20* (2013.01); *C07B 2200/13* (2013.01)

(58) Field of Classification Search
CPC ........ C07C 51/43; C07C 59/01; C07D 309/30; C07B 2200/13
See application file for complete search history.

(56) References Cited

FOREIGN PATENT DOCUMENTS

| JP | S-60153797 A | * | 8/1985 | ................ C12P 7/42 |
| JP | 2001335440 A | * | 12/2001 | ........... A61K 31/351 |

(Continued)

OTHER PUBLICATIONS

Scoppola, A., et al., Quantitation of plasma mevalonic acid using gas chromatography-electron capture mass spectrometry, Journal of Lipid Research, vol. 32, No. 6, pp. 1057-1060 (Year: 1991).*

(Continued)

*Primary Examiner* — Yate' K Cutliff

(57) ABSTRACT

Compositions and methods are provided for producing crystalline forms of organic acids or salts or lactones thereof from an aqueous solution. More specifically, methods are provided for producing a crystalline form of a salt of mevalonic acid (also referred to as X-MVA) from an aqueous solution, comprising subjecting the aqueous solution comprising said X-MVA to a purification step to produce a purified solution and crystallizing said X-MVA from said purified solution by water solvent crystallization. Methods are also provided for producing mevalonolactone from an aqueous solution comprising X-MVA, comprising subjecting the aqueous solution comprising said X-MVA to cation exchange thereby converting said aqueous solution comprising X-MVA to an aqueous solution comprising mevalono- (Continued)

lactone (MVL). Methods are also provided for producing mevalonolactone monohydrate crystals.

5 Claims, 4 Drawing Sheets

(56) References Cited

FOREIGN PATENT DOCUMENTS

| JP | 4868648 B2 | * | 2/2012 | ............ | A23C 9/152 |
| KR | 101914180 B1 | * | 4/2018 | ............ | C12N 15/70 |
| KR | 20180114391 A | * | 10/2018 | ............ | A23L 33/10 |

OTHER PUBLICATIONS

JP2001335440, Sugiyama Hiroshi et al., Hair Tonic, 4 pages, English translation (Year: 2001).*
JP4868648, Imaizumi Katsumi et al., Hypertriglyceridema treatment, 3 pages English translation (Year: 2012).*
KR20180114391, Kim Dae Hyun, et al., Skin-whiting cosmetic composition containing Mevalonolactone as a active ingredient, 13 pages, English translation (Year: 2018).*
JPS60153797, Takahara Kenju, et al., Fermentative production of Mevalonic acid, 5 pages, English translation (Year: 1985).*
KR101914180, (KR20180038092), Lee Pyung Cheon, et al., Biosynthesis method of mevalonates using a biodiesel by-product, 16 pages, English translation (Year: 2018).*

* cited by examiner

METHODS FOR RECOVERING ORGANIC ACIDS OR SALTS OR LACTONES THEREOF FROM AQUEOUS SOLUTIONS USING WATER SOLVENT CRYSTALLIZATION AND COMPOSITIONS THEREOF

This application claims the benefit of U.S. Provisional Application No. 62/892,760, filed Aug. 28, 2019, U.S. Provisional Application No. 63/012,492, filed Apr. 20, 2020 each of which incorporated by reference herein in their entireties.

FIELD

The present disclosure relates to the field of organic acid separation technology, and more particularly to methods for recovering organic acids and salts or lactones thereof from aqueous solutions using water solvent crystallization.

BACKGROUND

The known processes for isolation and purification of organic acid from solutions such as fermentation broth is very complex and commonly involves an organic solvent extraction step or solid phase absorption.

An important aspect for the industrial use of organic acids such as carboxylic acids which are generated by fermentation of carbohydrate-containing substrates using various microorganisms is the cost-effectiveness and efficiency of removing and purifying the organic acid or salt or lactones thereof from these aqueous fermentation solutions, which contain not only the organic acid or the organic acid salts or lactones but also further organic acids, other fermentation byproducts, microorganisms and the constituents thereof and also remnants of the substrates, such as sugars, proteins, lipids and other trace organic and inorganic compounds.

A classical way to purify microbially produced organic acids from fermentation broth is to protonate the target acid, by lowering the pH of the broth, and performing a liquid/liquid extraction using a partially miscible organic solvent. (Organic Laboratory Techniques, 3rd Edition pg. 49-67. Ralph Fessenden, Joan Fessenden, Patty Feist 2001, Brooks/Cole).

US2014/0371486 describes a method for purifying carboxylic acids from fermentation broths using solid phase adsorption. The method includes removing biomass and any solids present from the fermentation broth, finely cleaning up the biomass-free and solids-free fermentation broth by nanofiltration, and removing the carboxylic acid from the finely cleaned, biomass-free, and solids free fermentation broth by adsorption to one or more solid phases having tertiary amino groups. KR20180070117 describes a method for producing mevalonolactone from biosynthesized mevalonic acid using phosphoric acid.

U.S. Pat. No. 5,034,105 describes a method of crystallizing succinic acid from an undersaturated solution of a succinic acid salt, subjecting said salt solution to electrodialysis to form a supersaturated solution, followed by crystallizing the supersaturated solution of succinic acid by adding to said solution an effective amount of acetic acid to enhance the crystallization of the succinic acid.

A disadvantage of these methods is that additional substances are supplied to the process, which substances must no longer be present in the target product or the traces of which substances in the target product may lead to limitations in the quality and the applicability of the product. The practical implementation of the methods is also associated in some cases with considerable technical complexity and considerable energy consumption.

Therefore, there remains a need for developing more effective, reliable, environmentally friendly and/or economically feasible processes for purifying and recovering organic acids and salts and lactones thereof, and for producing crystalline forms of organic acids and salts or lactones thereof.

BRIEF SUMMARY

Compositions and methods are provided for producing crystalline forms of organic acids or salts or lactones thereof from an aqueous solution. In one aspect, crystalline mevalonolactone*monohydrate (MVL*$H_2O$) and methods to crystalize mevalonolactone*monohydrate (MVL*$H_2O$) are disclosed.

More specifically, in one aspect the specification provides a method for producing a crystalline form of a salt of mevalonic acid (also referred to as X-MVA) from an aqueous solution, comprising subjecting the aqueous solution comprising said X-MVA to a nanofiltration to produce a permeate and crystallizing said X-MVA from said permeate by water solvent crystallization (FIG. 1 A).

In another aspect, the specification provides a method for producing a water solubilized mevalonolactone from an aqueous solution wherein the method comprises: a) producing a crystalline form of a salt of mevalonic acid from an aqueous solution by subjecting the aqueous solution comprising said salt of mevalonic acid (X-MVA) to a nanofiltration to produce a permeate and crystallizing said salt of mevalonic acid from said permeate by water solvent crystallization to produce crystals of said salt of mevalonic acid; and, b) dissolving the crystals of (a) in water to produce a water solubilized salt of mevalonic acid and subjecting said liquid to cation exchange thereby converting said water solubilized salt of mevalonic acid to water solubilized mevalonolactone (FIG. 1B).

In yet another aspect, the specification provides a method for producing mevalonolactone from an aqueous solution comprising a salt of mevalonic acid salt (X-MVA), comprising subjecting the aqueous solution comprising said salt of mevalonate to cation exchange thereby converting said aqueous solution comprising a salt of mevalonate to an aqueous solution comprising mevalonolactone (MVL) and optionally producing a MVL of high purity (>90% purity) from said aqueous solution by concentrating said solution, producing mevalonolactone*monohydrate (MVL*$H_2O$) from said concentrated solution, and dissolving the mevalonolactone*monohydrate (MVL*$H_2O$) crystals in water to obtain the highly pure MVL solution (FIG. 2).

Compositions and methods are also provided for producing crystalline forms of mevalonolactone*monohydrate (MVL*$H_2O$).

Additional embodiments of the methods and compositions of the present disclosure are shown herein.

BRIEF DESCRIPTION OF THE DRAWINGS

The disclosure can be more fully understood from the following detailed description and the accompanying drawings, which form a part of this application.

Figures

DETAILED DESCRIPTION

Figure 1A:
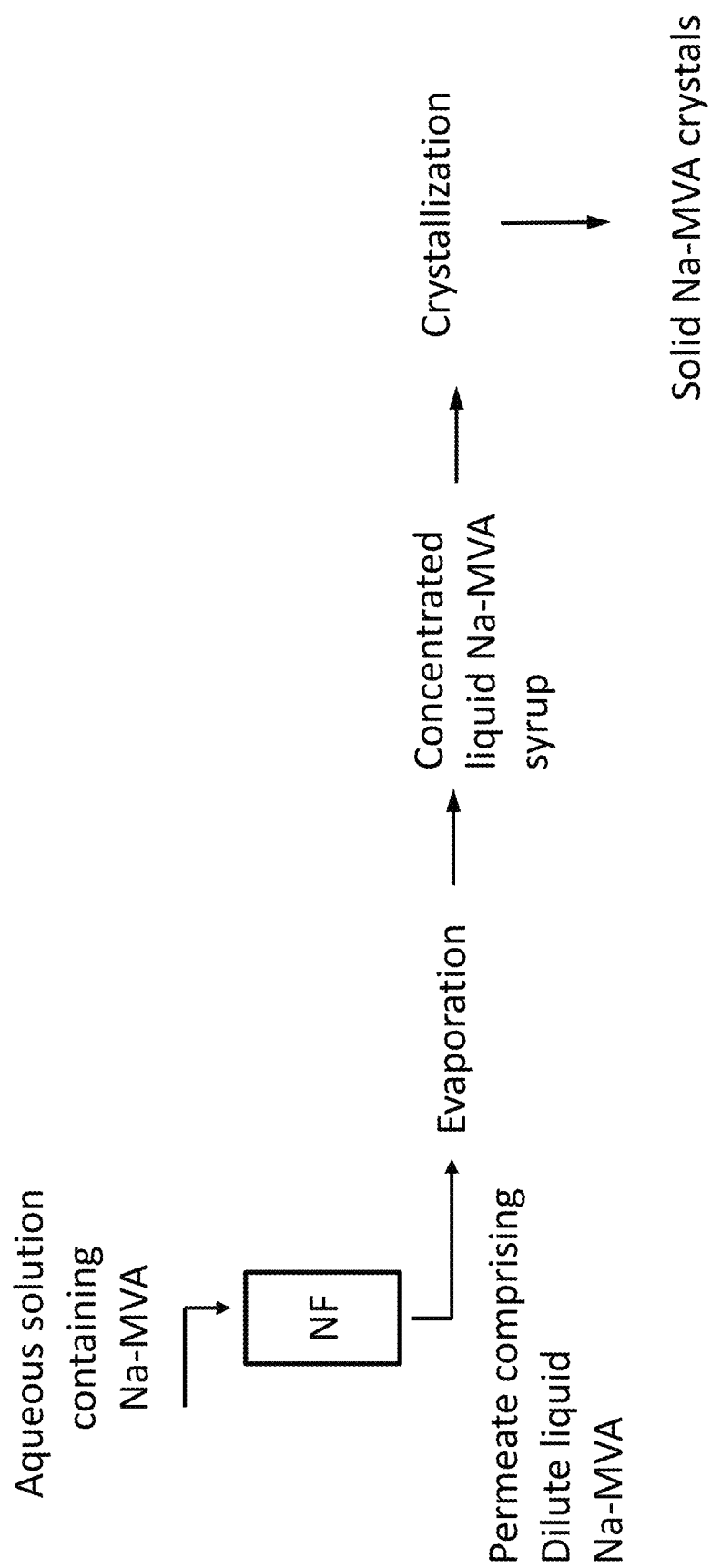
FIG. 1A depicts a schematic representation of a method for producing a crystalline form of a salt of mevalonic acid (X-MVA) (such as but not limiting to Na-MVA) from an aqueous solution, comprising subjecting the aqueous solution comprising said salt of mevalonic acid (Na-MVA) to a nanofiltration to produce a permeate and crystallizing said salt of mevalonic acid from said permeate by water solvent crystallization. The water solvent crystallization comprises evaporating the permeate to obtain a syrup comprising concentrated X-MVA, followed by cooling said syrup to produce crystals of the salt of mevalonic acid (such as Na-MVA crystals).

Compositions and methods are provided for recovering organic acids and salts and lactones thereof from aqueous solutions using water solvent crystallization. In one aspect, crystalline mevalonolactone*monohydrate (MVL*$H_2O$) and methods to crystalize mevalonolactone*monohydrate (MVL*$H_2O$) are disclosed.

More specifically, in one aspect the object of the present invention is to provide a method for recovering a salt of mevalonate (X-MVA) from solutions containing the same. In another aspect the object of the present invention is to provide a method for recovering mevalonolactone (MVL) from solutions containing a salt of mevalonate (X-MVA), mevalonolacdone (MVL), mevalonolactone*monohydrate (MVL*$H_2O$), or combinations thereof. The whole process for the recovery of salts of mevalonate and/or recovery of mevalonolactone may preferably be carried out in an aqueous solution without the use of organic solvents.

The methods described herein can result in a high purity MVL product (>90% purity) that has a water like look with little or no color formation. As such, the MVL produced by methods described herein, can be scaled for large scale manufacture and are of particular interest for the personal care industry, where a highly purified MVL product is of greater value if it is water clear, with little or no trace of colored contaminates present.

This detailed description is intended only to acquaint others skilled in the art with Applicant's invention, its principles, and its practical application so that others skilled in the art may adapt and apply the invention in its numerous forms, as they may be best suited to the requirements of a particular use. This detailed description and its specific examples, while indicating certain embodiments, are intended for purposes of illustration only. This specification, therefore, is not limited to the described embodiments, and may be variously modified.

The present document is organized into a number of sections for ease of reading; however, the reader will appreciate that statements made in one section may apply to other sections. In this manner, the headings used for different sections of the disclosure should not be construed as limiting.

The headings provided herein are not limitations of the various aspects or embodiments of the present compositions and methods which can be had by reference to the specification as a whole. Accordingly, the terms defined immediately below are more fully defined by reference to the specification as a whole.

Unless defined otherwise, all technical and scientific terms used herein have the same meaning as commonly understood by one of ordinary skill in the art to which the present compositions and methods belongs. Although any methods and materials similar or equivalent to those described herein can also be used in the practice or testing of the present compositions and methods, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited.

Definitions

In the specification and throughout the examples and the claims, the following definitions have been used:

The terms "Mevalonic acid (MVA)" or "(R)-Mevalonic acid" are used interchangeably herein and refer to (3R)-3,5-Dihydroxy-3-methylpentanoic acid with the chemical formula of $C_6H_{12}O_4$ and molar mass 148.16 g/mol. The carboxylate anion of mevalonic acid, is known as mevalonate. Mevalonic acid as described herein is a biologically active R-enatiomer.

The terms "salt of mevalonate" or "mevalonate salt" or "X-MVA" are used interchangeably herein and refer to a salt of mevalonic acid wherein X is the cation and MVA the carboxylate anion of mevalonic acid (hence X-MVA). The salt of mevalonate can be selected from the group consisting of Na-mevalonate (Na-MVA), K-mevalonate (K-MVA), ammonium mevalonate ($NH_4$-MVA), Lithium mevalonate (Li-MVA) any other monovalent salts of mevalonic acid, or any one combination thereof.

The terms "Mevalonolactone" or "(R)-Mevalonolactone" or "MVL" are used interchangeably herein and refer to (R)-3-Hydroxy-3-methyl-δ-valerolactone.

Aqueous solutions described herein include solutions containing both organic acids and their lactones which are converting to each other towards equilibrium concentrations. For example, mevalonic acid and mevalonolactone tends to equilibrium with each other. In this description, solutions containing organic acids do also contain lactone forms if not otherwise stated.

Mevalonolactone monohydrate is also referred to as MVL*$H_2O$.

SAC refers to a strong acid cation exchange resin.

WAC refers to a weak acid cation exchange resin.

DS refers to a dry substance content expressed as % by weight. Dry substance can be measured by Karl Fischer water titration.

RDS refers to a refractometric dry substance content, expressed as % by weight according to the correlation between refractometric index of aqueous sugar solution and DS.

IX or IEX refer to ion exchange process

BV/h refers to the volume flow rate through an ion exchange material contained in a column or operating unit. BV refers to bed volume which is volume of ion exchange material of specified ionic form contained in a column or operating unit.

Purity refers to the content of a component (such as Na-MVA, MVL, MVL*$H_2O$) on DS or RDS. The Area % calculation procedure reports the area of each peak in the chromatogram (such as an HPLC chromatogram) as a percentage of the total area of all peaks. For example, a purity of mevalonolactone of at least 90%, refers to the percentage being the peak area corresponding to MVL (90 in this case) relative to the total area of peaks (100) using chromatographic analysis. Purity can be measured by using HPLC (Rezex ROA-Organic Acid H+ (8%) column).

HPLC refers to high performance liquid chromatography.

Sodium mevalonate purity refers to the amount of sodium mevalonate as if all mevalonic acid, mevalonate, and mevalonolactone were in sodium mevalonate form divided by the total amount of dry substance.

Mevalonolactone purity refers to the total amount of mevalonolactone as if all mevalonic acid, mevalonate, and mevalonolactone were in mevalonolactone form divided by the total amount of dry substance.

Mevalonate yield refers to the amount of mevalonate in the target fraction (such as a nanofiltration permeate or a centrifugation cake) divided by the amount of mevalonate in the feed fraction (such as a nanofiltration feed or a centrifugation feed) as if all mevalonic acid, mevalonate, and mevalonolactone were in mevalonate form.

Mevalonolactone yield refers to the amount of mevalonolactone in the target fraction (such as a cation exchange product or a centrifugation cake) divided by the amount of mevalonolactone in the feed fraction (such as a cation exchange feed or a centrifugation feed) as if all mevalonic acid, mevalonate, and mevalonolactone were in mevalonolactone form.

Color refers to a color value under the International Commission for Uniform Process of Sugar Analysis ("ICUMSA") sugar color grading system.

DSC thermogram was measured by using Mettler Toledo DSC822e differential scanning calorimeter. The measurement was run in standard 40 µL aluminum crucible in flowing nitrogen atmosphere with a flow rate of 80 m/min. The temperature range was 0-0° C. and the heating rate was 2° C./min.

Optical rotation was measured from water solution which mevalonolactone concentration was 2 g/100 mL at a temperature of 20° C. by using Anton Paar MCP Sucromet with 100 mm cuvette and Na 589 light.

The meaning of abbreviations is as follows: "sec" means second(s), "min" means minute(s), "h" or "hr." means hour(s), "d" means day(s), "µL" means microliter(s), "mL" means milliliter(s), "L" means liter(s), "µM" means micromolar, µm means micrometer, "mM" means millimolar, "M" means molar, "mmol" means millimole(s), "µmole" mean micromole(s), "kg" means kilogram(s), "g" means gram(s), "µg" means microgram(s), "ng" means nanogram(s), "U" means unit(s), "bp" means base pair(s) and "kb" means kilobase(s).

Starting Materials.

The solutions used in described methods comprise aqueous solutions comprising organic acids or salts or lactones thereof. More specifically, in one aspect the starting material is an aqueous solution comprising at least MVA and/or one salt of mevalonate (X-MVA). In one aspect the starting material is an aqueous solution comprising mevalonolactone (MVL) or mevalonolactone monohydrate (MVL*$H_2O$). The starting material may be selected for example from liquor originating from fermentation and/or from water solutions containing MVA, a salt of mevalonate, mevalonolactone, mevalonolactone monohydrate, or any one combination thereof.

In some embodiments, the aqueous solution comprises (or is derived in whole or in part from) a product of a fermentation. In some such embodiments, the aqueous solution is (or derived in whole or in part from) the product of a fermentation used to make the MVA, X-MVA and/or MVL to be purified. In some embodiments, the fermentation comprises culturing, in an aqueous culture medium comprising a carbohydrate, a recombinant microorganism comprising at least one recombinant polynucleotide sequence encoding an enzyme (or enzymes) capable of producing MVA, X-MVA and/or an MVL. The product of the fermentation process may be referred to as a fermentation "product" or "broth." The product typically comprises many ingredients in addition to the X-MVA and/or an MVL to be purified, including, for example, monovalent and divalent salts, sugars, oligosaccharides, monosaccharides, amino acids, polypeptides, proteins, organic acids, nucleic acids, etc. The aqueous solutions can include some alcohol or other solvents from fermentation.

Examples of enzymes often useful for production of MVA include MvaE (Acetyl-CoA acetyltransferase/HMG-CoA reductase) and MvaS (Hydroxymethylglutaryl-CoA synthase). The mvaE gene encodes a polypeptide (MvaE) that possesses both thiolase and HMG-CoA reductase activities. The mvaS gene encode a polypeptide (MvaS) having HMG-CoA synthase activity. The enzymes capable of producing MVA (and corresponding nucleotide sequences) may originate from, but are not limited to, *Listeria grayi*, *Enterococcus faecalis* (*Streptococcus faecalis*), *Enterococcus faecium*, *Enterococcus gallinarum*, and *Enterococcus casseliflavus*.

The fermentation broth can be a broth obtained from a fermentation of any organism that is capable of producing MVA or MVL. In some embodiments, the fermentation broth is a broth obtained from an *Escherichia coli* fermentation. In some aspects, the starting aqueous solution can be a fermentation broth that is neutral in pH, such as but not limiting to fermentation broths obtained from fermentations with *Escherichia coli*, wherein said fermentation broth comprises the mevalonic acid as a salt. The starting aqueous solution can also be a fermentation broth that is low in pH (pH 3-5) wherein said fermentation broth comprises the mevalonic acid partly in acid form and partly as a salt of mevalonate. The fermentation broth can be a clarified fermentation broth, wherein the clarification is obtained by ultrafiltration of the feed fermentation broth.

In some embodiments, the organic acid to be purified is MVA, and the MVA starting solution comprises (or is derived in whole or in part from) a product of a fermentation process wherein the fermentation process comprises culturing, in an aqueous culture medium, a recombinant microorganism comprising a recombinant polynucleotide sequence encoding an MvaE and a MvaS.

The fermentation broth can be clarified by removing biomass and any insoluble solids from said fermentation broth by at least one of precoat filtration, microfiltration, centrifugation, or ultrafiltration. Ultrafiltration can be beneficial to, for example, remove large biomolecules, such as endotoxins, proteins, nucleic acids and lipopolysaccharides.

Cell biomass may be separated from a fermentation product using, for example, filtration, centrifugation, sedimentation and/or other process suitable for removing cell biomass.

Nanofiltration

As described herein, in one aspect the object of the invention is a purification method for producing a crystalline form of a salt of mevalonic acid (also referred to as X-MVA or X-mevalonate) from an aqueous solution, comprising subjecting the aqueous solution comprising said salt of mevalonic acid (X-MVA) to a nanofiltration to produce a permeate and crystallizing said salt of mevalonic acid from said permeate by water solvent crystallization (see also FIG. 1 A and Examples 1-4).

Nanofiltration (NF) is a pressure-driven membrane filtration-based process. The nanofiltration provides two fractions: a retentate and a permeate. In one aspect of the invention, the NF process aims to purify the salt of mevalonic acid (such as but not limiting to a Na-mevalonate, K-mevalonate, Li-mevalonate, ammonium mevalonate or other monovalent salt of mevalonic acid) to the permeate (also referred to as the filtrate). The retentate (also referred to as the concentrate) from the process is waste containing antifoam, endotoxin, colour components, divalent salts and larger molecules. In one embodiment of the invention an aqueous solution is used as a feed for nanofiltration to obtain a permeate with a high content of a salt of mevalonate (at least 60% sodium mevalonate in permeate, Examples 1-4) and only small amount of waste materials.

The starting aqueous solution can be a fermentation broth that is neutral in pH, such as but not limiting to fermentation broths obtained from fermentations with *Escherichia coli*, wherein said fermentation broth comprises the mevalonic acid as a salt. The starting aqueous solution can also be a fermentation broth that is low in pH (pH 3-5) wherein said fermentation broth comprises the mevalonic acid partly in acid form and partly as a salt of mevalonate. The nanofiltration in accordance with the present invention may be carried out as a batch process or a continuous process.

The nanofiltration is typically carried out at a temperature in the range of 5 to 80° C., preferably 30 to 75° C. and most preferably 50 to 70° C. The pressure in the nanofiltration is typically in the range of 5 to 60 bar, preferably 10 to 50 bar and most preferably 20 to 45 bar. The pH may be in the range of 1 to 10, preferably 3 to 9 and most preferably 6 to 9. The pH depends on the composition of the starting solution and the membrane used for the nanofiltration and the stability of the components to be recovered. If necessary, the pH of the starting solution may be adjusted to the desired value before nanofiltration.

The nanofiltration is typically carried out with a flux of 1 to 100 l/m²h, preferably with a flux of 2 to 50 l/m²h, and most preferably with a flux of 3 to 12 l/m²h depending on the concentration and the viscosity of the nanofiltration feed.

The nanofiltration membrane used in the present invention can be selected from polymeric and inorganic membranes having $MgSO_4$ retention of 50 to 99% (at 25° C., 2 g/l concentration, 8 bar, pH 6), preferably 70 to 99% (at 25° C., 2 g/l concentration, 8 bar, pH 6), more preferably 80 to 98% (at 25° C., 2 g/l concentration, 8 bar, pH 6), most preferably 90 to 98% (at 25° C., 2 g/A concentration, bar, pH 6). In one aspect the nanofiltration membrane is the nanofiltration membrane XN45 that has a $MgSO_4$ retention of about 92-98%.

Nanofiltration membranes having $MgSO_4$ retention of 99% or greater MgSO4 retention have too high monovalent salt retention and low MWCO and thus too high X-MVA salt retention. Membranes having $MgSO_4$ retention of <90% MgSO4 retention don't give as high purification as also small divalent salts are passing.

In some embodiments, the membrane has a molecular weight cut-off (MWCO) in the range of about 100 to about 700 Daltons MWCO membranes, such as but not limiting to the TriSep XN45 membrane. The TriSep XN45 membrane is characterized as a 300-500 Dalton MWCO membrane. In some embodiments, the membrane has a molecular weight cut-off (MWCO) in the range of about 150 to about 400 Daltons. In some embodiments, the membrane has a molecular weight cut-off (MWCO) in the range of about 150 to about 300 Daltons, such as but not limiting to Suez duratherm EXL DL and DK membranes. Suez duratherm EXL DL and DK membranes are characterized as 150-300 Dalton MWCO membranes. MWCO and MgSo4 retention are both important parameters for selecting nanofiltration membranes. In one aspect the membranes for the process as described are nanofiltration membranes having a MWCO above 150 Da, but also high divalent salt rejection (>90% MgSO4)), such as but not limiting to TriSep XN45 type membranes.

In some embodiments, the membrane has a molecular weight cut-off (MWCO) in the range of about 100 to about 900 Daltons and a $MgSO_4$ retention of about 50 to 99% at 25° C. In some embodiments, the membrane has a molecular weight cut-off (MWCO) in the range of about 150 to about 500 Daltons and a $MgSO_4$ retention of about 80-99% at 25° C. In some embodiments, the membrane has a molecular weight cut-off (MWCO) in the range of about 150 to about 300 Daltons and a $MgSO_4$ retention of about 98 to 99% at 25° C.

The nanofiltration membranes which are useful in the present invention may have a negative or positive charge. The membranes may be ionic membranes, i.e. they may contain cationic or anionic groups, but even neutral membranes are useful. The nanofiltration membranes may be selected from hydrophobic and hydrophilic membranes.

The typical form of nanofiltration membranes comprises spiral wound membranes. The membrane configuration may also be selected e.g. from flat sheets, tubes and hollow fibers. "High shear" membranes, such as vibrating membranes and rotating membranes can also be used. The membrane can be tubular, spiral or flat in shape.

The nanofiltration equipment useful in the present invention comprises at least one nanofiltration membrane element dividing the starting material (feed) into a retentate and permeate section. The nanofiltration equipment typically also include means for controlling the pressure and flow, such as pumps and valves and flow and pressure meters and controllers. The equipment may also include several nanofiltration membrane elements in one pressure vessel in different combinations, arranged in parallel or in series.

The yield of X-MVA (the salt of mevalonate, such as for example Na-mevalonate) in the nanofiltration is typically more than 70%, preferably more than 80% and most preferably more than 90% on the Na-mevalonate present in the starting material.

Na-mevalonate content in the permeate is more than 50% on DS, preferably more than 60% on DS, more preferably more than 70% on DS, and most preferably more than 80% on DS.

The nanofiltration permeate may be subjected to further concentration, by evaporation or any means know in the art to further concentrate the salt of mevalonate, such as but not limiting to evaporation under reduced pressure (vacuum evaporation) to produce a concentrated aqueous syrup. Na-mevalonate content in concentrated aqueous syrups can be more than 60% on DS, preferably between 65%-95% on DS.

The nanofiltration permeate may be subjected to further purification steps selected from ion exchange, evaporation, electrodialysis and filtration. These further purification steps may be carried out before or after said membrane filtration. Furthermore, the recovered salt of mevalonate fractions may be subjected to one or more further steps, such as evaporation, concentration, filtration, ion exchange, active carbon treatment, sterile filtration, crystallization, intermediate crystallization, nanofiltration and chromatographic fractionation. The recovered salt of mevalonate fraction(s) may be treated in different ways, depending on the purity of the fractions. In some embodiments, the permeate collected from the nanofiltration and/or the concentrated aqueous syrup is subjected to a subsequent crystallization step.

In one aspect, as described herein, the method is a method for producing a crystalline form of a salt of mevalonic acid (X-MVA) from an aqueous solution, comprising subjecting the aqueous solution comprising said salt of mevalonic acid to a purification step, whereby said purification step produces a purified solution comprising X-MVA of a purity of at least 60%, and crystallizing said salt of mevalonic acid from said purified solution by water solvent crystallization, wherein said purification step comprises subjecting the aqueous solution comprising said salt of mevalonic acid to a nanofiltration to produce a permeate, wherein said permeate comprises X-MVA at a purity of at least 60%.

Alternatively, in one aspect, the method is a method for producing a crystalline form of a salt of mevalonic acid (X-MVA) from an aqueous solution, comprising subjecting the aqueous solution comprising said salt of mevalonic acid to a purification step, whereby said purification step produces a purified solution comprising X-MVA of a purity of at least 60%, and crystallizing said salt of mevalonic acid from said purified solution by water solvent crystallization, wherein said purification step comprises subjecting the aqueous solution comprising said salt of mevalonic acid to microfiltration, electrodialysis, ion exchange, filtration, active carbon treatment, evaporation, concentration, sterile filtration, chromatographic fractionation, or any one combination thereof.

Cation Exchange

Figure 1B:
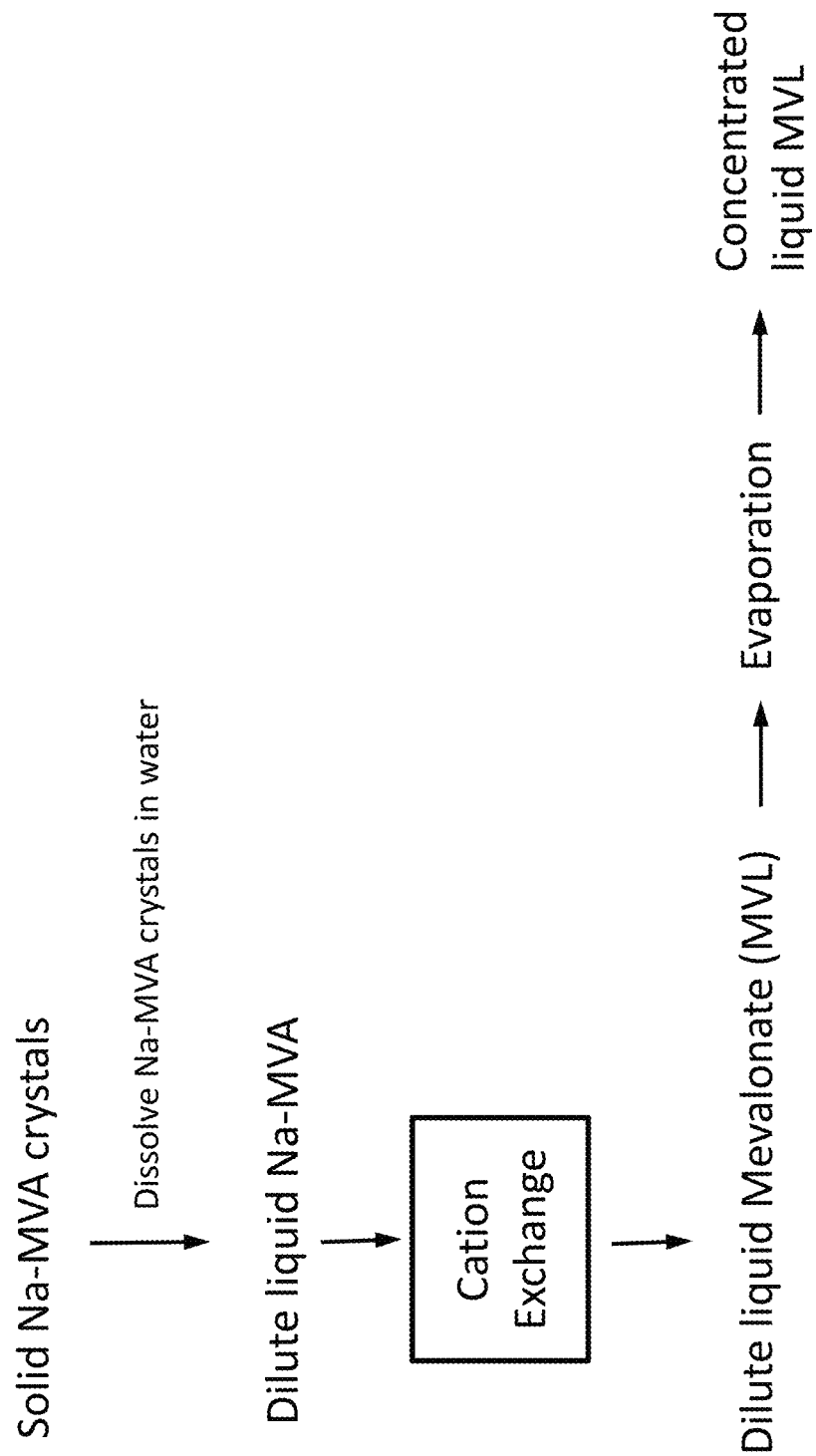
FIG. 1B depicts a schematic representation of a method for producing a water solubilized mevalonolactone (MVL) from an aqueous solution wherein the method comprises dissolving the crystals of the salt of mevalonic acid (such as Na-MVA crystals) obtained via the method described in FIG. 1A in water to produce a water solubilized salt of mevalonic acid (X-MVA) and subjecting said liquid to cation exchange thereby converting said water solubilized salt of mevalonic acid (X-MVA) to water solubilized mevalonolactone (MVL), and optionally concentrating the water solubilized mevalonolactone via evaporation.

In one aspect, the specification provides a method for producing a water solubilized mevalonolactone from an aqueous solution wherein the method comprises: a) producing a crystalline form of a salt of mevalonic acid from an aqueous solution by subjecting the aqueous solution comprising said salt of mevalonic acid (X-MVA) to a nanofiltration to produce a permeate and crystallizing said salt of mevalonic acid from said permeate by water solvent crystallization to produce crystals of said salt of mevalonic acid; and, b) dissolving the crystals of (a) in water to produce a water solubilized salt of mevalonic acid and subjecting said liquid to cation exchange thereby converting said water solubilized salt of mevalonic acid to water solubilized mevalonolactone (FIG. 1B and Example 9-12).

Figure 2:
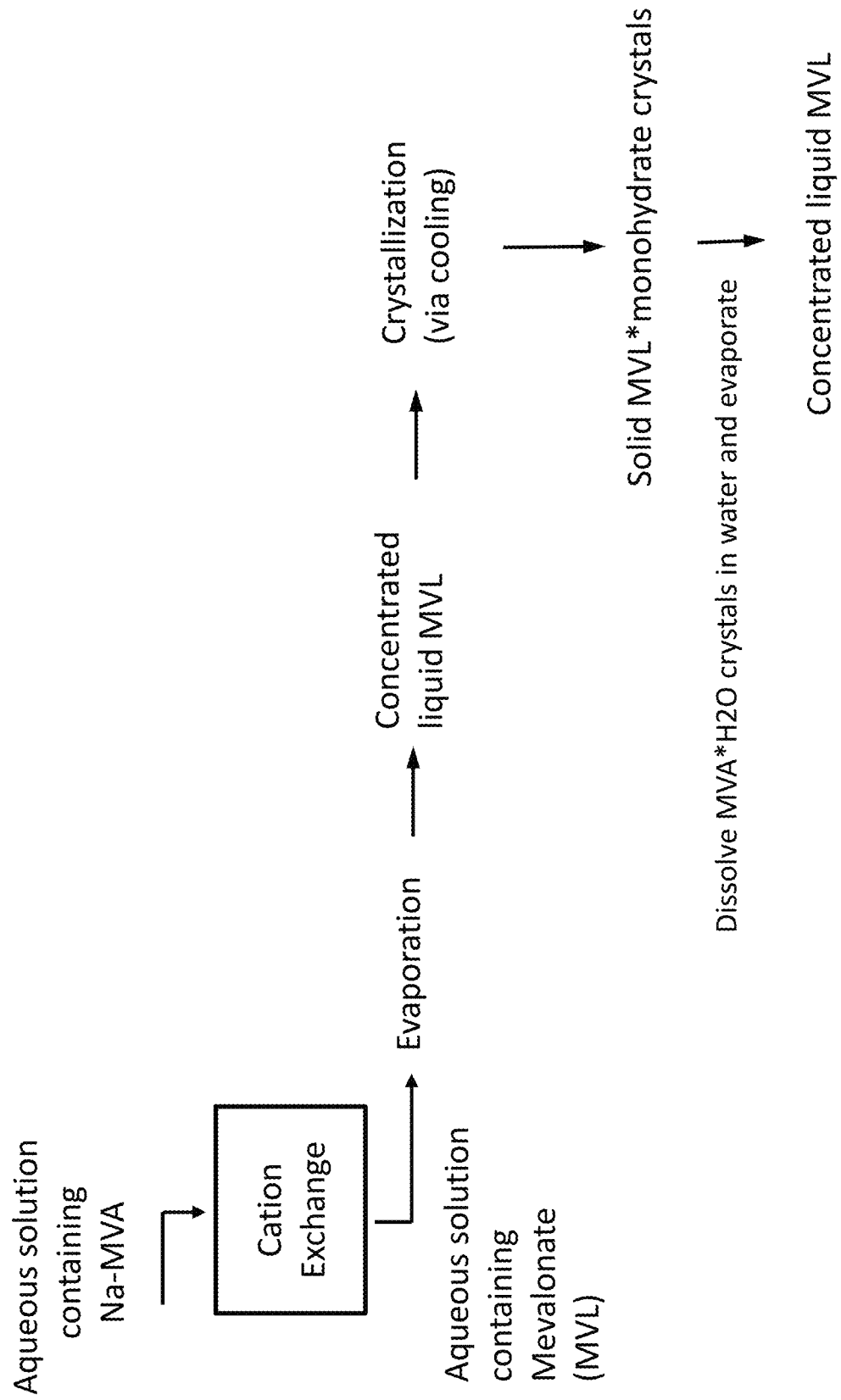
FIG. 2 depicts a schematic representation of a method for producing mevalonolactone from an aqueous solution comprising a salt of mevalonic acid (X-MVA), comprising subjecting the aqueous solution comprising said salt of mevalonate to cation exchange thereby converting said aqueous solution comprising a salt of mevalonate to an aqueous solution comprising mevalonolactone (MVL), and optionally concentrating said solution to a syrup that can produce mevalonolactone*monohydrate crystals when stored at cool temperatures below about 23° C. The mevalonolactone*monohydrate crystals can optionally be further dissolved in water and concentrated to produce a highly concentrated and pure MVL liquid (>90% purity).

In another aspect, the specification provides a method for producing mevalonolactone from an aqueous solution comprising a salt of mevalonic acid salt (X-MVA)), comprising subjecting the aqueous solution comprising said salt of mevalonate to cation exchange thereby converting said aqueous solution comprising a salt of mevalonate to an aqueous solution comprising mevalonolactone (MVL) (FIG. 2).

Strong Acid Cation Exchange Resins (SAC Resins)

The SAC resins may have a styrene or acrylic skeleton. In one embodiment of the invention, the resin is a sulphonated polystyrene-co-divinylbenzene resin. Other alkenyl aromatic polymer resins like those based on monomers like alkyl-substituted styrene or mixtures thereof can also be applied. The resin may also be crosslinked with other suitable aromatic crosslinking monomers, such as divinyltoluene, divinylxylene, divinylnaphtalene, divinylbenzene, or with aliphatic crosslinking monomers, such as isoprene, ethylene glycol diacrylate, ethylene glycol dimethacrylate, N,N'-methylene bis-acrylamide or mixtures thereof. The cross-linking degree of the resin is typically from about 1 to about 20%, preferably from about 3 to about 8% of the cross-linking agent, such as divinyl benzene (DVB). The SAC resins used for the ion exchange of the invention may be in a multivalent, divalent or monovalent cation form. The monovalent cation forms may be selected from $H^+$, $Na^+$ and $K^+$, for example. Examples of divalent cation forms are $Ca^{2+}$, $Mg^{2+}$, $Zn^{2+}$, $Sr^{2+}$ and $Ba^{2+}$. An example of a trivalent cation form is $Al^{3+}$. In a preferred embodiment of the invention, the SAC resin used for the ion exchange of the invention is in a monovalent H form. A typical mean average particle size of the resin is 10 to 2000 μm, preferably 300 to 1200 μm.

In one embodiment, a monovalent SAC resin is used for the ion exchange of a salt of mevalonic acid (X-MVA) to produce mevalonolactone (MVL), wherein the monovalent cation is in a $H^+$ form.

Weak Acid Cation Exchange Resins (SAC Resins)

The WAC resins are acrylic cation exchange resins, having carboxylic functional groups. The acrylic WAC resin is typically derived from the group consisting of an acrylate ester, acrylonitrile, acrylic acids and mixtures thereof. The acrylate ester is selected from the group consisting of methyl methacrylate, methyl acrylate, ethyl acrylate and butyl acrylate. The matrix of the WAC resins may also be other than acrylic. The active functional groups of the WAC resins may also be other than carboxylic groups. They may be selected from other weak acids, for example. The WAC resin may be in a $H^+$, $Na^+$, $K^+$, $Ca^{2+}$ or $Mg^{2+}$, form, preferably in a $H^+$ or $Na^+$ form. Other ion forms may also be used.

The WAC resin is crosslinked with an aromatic crosslinker, preferably divinylbenzene (DVB). It may also be crosslinked with an aliphatic crosslinker, such as isoprene, 1,7-octadiene, trivinylcyclohexane, diethylene glycol divinylether. The crosslinking degree is from 1 to 20%, preferably from 3 to about 8% DVB.

The average particle size of the WAC resin is from 10 to 2000 μm, preferably from to 1200 μm.

The ion-exchange is preferably performed by using cation exchange resin, particularly strong acid cation resin, particularly in $H^+$-ion form.

In one embodiment, a monovalent WAC resin is used for the ion exchange of a salt of mevalonic acid (X-MVA) to produce mevalonolactone (MVL), wherein the monovalent cation is in a $H^+$ form.

Water Solvent Crystallization

As described herein, in one aspect the object of the invention is a method for producing a crystalline form of a salt of mevalonic acid (also referred to as X-MVA or X-mevalonate) from an aqueous solution, comprising subjecting the aqueous solution comprising said salt of mevalonic acid (X-MVA) to a purification step such as but not limiting to a nanofiltration to produce a high purity solution (permeate) that allows for crystallization of said X-MVA, and crystallizing said salt of mevalonic acid from said permeate by water solvent crystallization (FIG. 1A and Examples 5-8).

In another aspect of the invention, the specification provides a method for producing mevalonolactone from an aqueous solution comprising a salt of mevalonic acid salt (X-MVA)), comprising subjecting the aqueous solution comprising said salt of mevalonate to cation exchange thereby converting said aqueous solution comprising a salt of mevalonate to an aqueous solution comprising mevalonolactone (MVL) and optionally followed by concentrating said MVL solution and crystallization said solution to obtain MVL*monohydrate crystals (FIG. 2 and Examples 13-20)

The term "water solvent crystallization" refers to a crystallization that is carried out using an aqueous solvent such as water, without the use of any organic solvent.

Water Solvent Crystallization of X-MVA

The crystallization of X-MVA may be carried out by traditional methods, such as cooling crystallization or precipitation crystallization in a temperature range of 10 to 80° C. The crystallization of X-MVA may also advantageously be carried out by a boiling crystallization method or by a boiling and cooling crystallization method.

In one embodiment of the disclosure, the crystallization of X-MVA is carried out from a solution (feed solution) having an X-MVA purity of more than 60%, preferably more than 70%, more preferably more than 80%, most preferably more than 90% and especially more than 95% on DS. The crystallization typically provides a crystalline X-MVA product having a purity of more than 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 89%, 90%, 91%, 92%, 93%, 94% preferably more than 95% and most preferably more than 99%, on DS.

The solution containing X-MVA can be first evaporated to an appropriate dry substance content (e.g. to an DS of about 60 to 90%) depending on the X-MVA content of the solution. The syrup DS concentration must be high enough to have crystallization potential (supersaturation). The minimum DS content depends on the temperature and purity of the syrup. The higher the purity of the syrup is, the lower the syrup DS needs to be. If the DS is too high, then the crystallization is retarded or the crystal suspension come too dense for efficient crystal separation. In one embodiment of the invention the syrup containing Na-MVA has a purity between 65-99%.

The supersaturated solution may be seeded with seed crystals of X-MVA. The seeds, if used, are crystals in a dry form or they are suspended in a solvent, preferably in water, and preferably the crystal size is reduced for example by pulverizing or milling. Temperature of evaporation of solution containing X-MVA may range between 30° C. to 80° C. After seeding, the crystallization mass is subjected to cooling with simultaneous mixing until the crystallization yield and viscosity is optimal for the separation of crystals. The cooling time is preferably 10 to 60 hours. The temperature drop during cooling is preferably 5 to 40° C. The seeded syrup comprising Na-MVA can be cooled to a temperature of about 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C. to about 75° C. or higher. The cooling can occur for a period of about 2 hr., 3 hr., 4 hr., 5 hr., 6 hr., 7 hr., 8 hr., 9 hr., 10 hr., 11 hr., 12 hr., 13 hr., 14 hr., 15 hr., 16 hr., 17 hr., 18 hr. or more. The cooling can occur under continuous stirring or mixing. Mixing can be beneficial in controlled crystallization. Mixing prevents crystals from settling, maintain a crystal growth and reduces spontaneous crystal formation. Mixing is also promoting beneficial heat and mass transfer. The crystallization mass may then be mixed at the final temperature for a period of time, preferably 0.5 to 24 hours, to reach the maximum crystallization yield. The crystals are separated from the mother liquor for example by filtration or centrifugation.

In one embodiment of the present invention, X-MVA crystals having a high purity are X-MVA crystals having a content over 97% on DS, preferably over 98% on DS, and more preferably over 99% on DS that are obtained by one crystallization step (=single-stage crystallization) from a solution having X-MVA content over 65% on DS without dissolving and recrystallization steps. Single stage crystallization may comprise boiling and cooling steps but no recrystallization step.

In another embodiment of the invention, the crystallization of X-MVA comprises washing as a further step. The washing is typically made in connection with the crystal separation from the mother liquor. Additional washing can be made by mixing aqueous washing solvent and crystal cake and separating crystals thereafter. The washing solvent can be water. This embodiment of the invention typically provides X-MVA with a purity of more than 98%.

Seed crystals can be made by various processes. In some embodiments, the dry seeds are milled to get smaller particle size. The desired amount of seed crystals may depend on, for example, the size of the seed crystals. In some embodiments, crystallization is initiated without adding seed crystals to the supersaturated solution. In some such embodiment, for example, seeding is effected using spontaneous seeding.

In some embodiments, initiation of crystallization (e.g., addition of seed crystals) is carried out when the dry solids content of the syrup is at least about 60% (by weight). In some embodiments, initiation of crystallization (e.g., addition of seed crystals) is carried out when the dry solids content of the syrup is at least about 70% (by weight). In some embodiments, initiation of crystallization (e.g., addition of seed crystals) is carried out when the dry solids content of the syrup is at least about 80% (by weight). In some embodiments, initiation of crystallization (e.g., addition of seed crystals) is carried out when the dry solids content of the syrup is from about 60 to about 90% (by weight). In some embodiments, initiation of crystallization (e.g., addition of seed crystals) is carried out when the dry solids content of the syrup is from about 70 to about 90% (by weight). In some embodiments, initiation of crystallization (e.g., addition of seed crystals) is carried out when the dry solids content of the syrup is from about 80 to about 90% (by weight). In some embodiments, initiation of crystallization (e.g., addition of seed crystals) is carried out when the dry solids content of the syrup is from about 80 to about 88% (by weight).

The evaporation can be continued after seeding, if the crystal growth potential and viscosity allows. After evaporation, the crystallization mass is subjecting to cooling with simultaneous mixing, until the crystal content and viscosity is optimal for the separation of crystals. The crystallization mass is typically cooled to a temperature of 10 to 75° C. The crystallization mass may then be mixed at the final temperature for a period of time, preferably from 0.5 hours to 24 hours to reach the maximum crystallization yield, where after the crystals are separated for example by filtering or centrifuging. The process of the invention typically comprises washing of the crystals as a further step. The washing is typically made in connection with the crystal separation from the mother liquor. Additional washing can be made by mixing washing solvent and crystal cake and separating crystals thereafter. The washing solvent can be water.

In some embodiments, recrystallization is performed one or more times to increase X-MVA purity. Recrystallization may be carried out by, for example, dissolving the X-MVA crystals in water (typically deionized water), bringing the resulting solution to a supersaturated state with respect to X-MVA (via, for example, evaporation), seeding and crystallizing using the crystallization-by-cooling methodology described above.

In some embodiments, yield is increased by performing crystallization of the mother liquor produced by the initial crystallization. Such a crystallization may be carried out by, for example, bringing the mother liquor to a supersaturated state with respect to X-MVA (via, for example, evaporation), seeding and crystallizing using the crystallization-by-cooling methodology described above.

The crystallization described in this specification does not require an organic solvent to be present in the solution. Crystalline X-MVA which is free from organic solvents is obtained. Crystalline X-MVA which has been produced without adding any organic solvents in crystallization steps is essentially free from organic solvents.

Although organic solvents can be added to aqueous solutions to modify crystallization and crystal separation performance, such addition of organic solvents has disadvantages such as, but not limiting to, obtaining crystals or purified products that comprise small amounts of these organic solvents, which are not desired in commercial compositions such as personal care composition.

Water Solvent Crystallization of MVL*Monohydrate

As described herein, it has been found surprisingly and unexpectedly that when a high purity syrup of MVL was prepared by methods described herein and cooled at temperatures below 23° C. for several weeks mevalonolactone monohydrate (MVL*$H_2O$) crystals formed spontaneously. These mevalonolactone monohydrate (MVL*$H_2O$) crystals can be used as seed material for further facilitating crystallization of MVL*$H_2O$ as described herein. MVL*$H_2O$ crystallization was accomplished at a temperature below the melting point, including at temperatures below 23° C., 22° C., 21° C., 20° C., 19° C., 18° C., 17° C., 16° C., 15° C., 14° C., 13° C., 12° C., 11° C., 10° C., 9° C., 8° C., 7° C., 6° C., 5° C., 4° C., 3° C., 2° C., 1° C. and down to 0° C. Crystallization of MVL*$H_2O$ is possible below 0° C. until down to the freezing point of the solution. In one embodiment of the invention, the crystallization of MVL*monohydrate (MVL*$H_2O$) is carried out from an aqueous solution having an MVL purity of more than 55%, preferably more than 70%, more preferably more than 80%, most preferably more than 90% and especially more than 95% on DS. The crystallization typically provides a crystalline MVL*$H_2O$ product having a purity of more than 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 89%, 90%, 91%, 92%, 93%, 94% preferably more than 95% and most preferably more than 99%, on DS.

In one aspect cooling crystallization of MVL*$H_2O$ is preferred over constant temperature crystallization due to practical reasons. Constant temperature crystallization requires very high seeding supersaturation which results in less controllable process than with cooling. MVL*$H_2O$ liberates lot of heat during crystallization and that heat must be removed from the system to reach desirable crystallization yields. In some instance, like having very high seeding supersaturation, the crystallization is really fast and the temperature of the crystallizing suspension can rise significantly. This can be overcome by having effective cooling means or utilizing lower seeding supersaturation and controlled cooling.

The solution containing MVL can be first evaporated to an appropriate dry substance content (e.g. to a DS of about 65 to 90%) depending on the MVL content of the solution. The syrup DS concentration must be high enough to have crystallization potential (supersaturation). The minimum DS content depends on the temperature and purity of the syrup. The higher the purity of the syrup is, the lower the syrup DS needs to be. If the DS is too high, then the crystallization is retarded or the crystal suspension come too dense for efficient crystal separation. The supersaturated solution may be seeded with seed crystals of MVL*$H_2O$ crystals. The seeds, if used, are crystals in a dry form or they are suspended in a solvent, preferably in water and preferably the crystal size is reduced for example by pulverizing or milling. After seeding, the crystallization mass is subjected to cooling with simultaneous mixing until the crystallization yield and viscosity is optimal for the separation of crystals.

Conditions for crystallizing MVL*$H_2O$ are further described in Examples 13-20.

In one aspect the mevalonolactone*monohydrate (MVL*$H_2O$) crystals can be warmed up to a temperature such that the crystals turn into a liquid (such as but not limiting to room temperatures of about 23° C.-30° C.) without adding any additional water. Such a liquid comprises about 87% MVL and 13% water.

Mevalonolactone monohydrate (MVL*$H_2O$) crystals can be dissolved in water to produce highly purified MVL (>90% purity) that has a water like look and viscosity with little or no color. This highly purified MVL solution can be further concentrated by evaporation while retaining a water like look.

Compositions Comprising MVA, X-MVA, MVL and/or MVL*$H_2O$

The crystalline X-MVA or a composition comprising the crystalline X-MVA may be used as an ingredient for example for dietary supplements, infant and human nutrition, pharmaceuticals and cosmetics.

The MVA, X-MVA, MVL and/or MVL*$H_2O$ purified by a process of this specification or a composition comprising the MVA, X-MVA, MVL and/or MVL*$H_2O$ described herein can be used as an ingredient for example for dietary supplements, personal care compositions (such as but not limiting to skin care, oral care, hair care compositions), pharmaceuticals and cosmetics.

For the purpose of using MVA or MVL in the personal care industry, the purified product is of greater value if it is water clear, with little or no trace of colored contaminates present. As described herein the highly purified MVL product resulting from the methods described herein had a water clear look with little or no remaining color.

Non-limiting examples of compositions and methods disclosed herein are as follows:

1. A method for producing a crystalline form of an organic acid or salt thereof from an aqueous solution, comprising subjecting the aqueous solution comprising said organic acid or salt thereof to a nanofiltration to produce a permeate and crystallizing the organic acid or salt thereof from said permeate by water solvent crystallization.
2. The method of embodiment 1, wherein the water solvent crystallization comprises evaporating the permeate to obtain a syrup comprising at least 60% DS, followed by cooling said syrup to produce crystals of said organic acid or salt thereof.
3. The method of embodiment 1, wherein the aqueous solution is a fermentation broth.
4. The method embodiment 3, wherein the fermentation broth is clarified by removing biomass and any solids from said fermentation broth by at least one of precoat filtration, microfiltration, or ultrafiltration.
5. The method of embodiment 3, wherein the fermentation broth is a broth obtained from an *Escherichia coli* fermentation.
6. The method of embodiment 2, further comprising removing said crystals of said organic acid, or salt thereof, from said syrup by filtration and centrifugation.
7. The method of embodiment 1, wherein the organic acids are carboxylic acids.
8. The method of embodiment 7, wherein the carboxylic acids are selected from group consisting of hydroxycarboxylic acids and dicarboxylic acids.
9. The method of embodiment 8, wherein the hydroxycarboxylic acids are selected from the group consisting of malic acid, glycolic acid, isocitric acid, mandelic acid, lactic acid, tartronic acid, tartaric acid, citric acid, beta-hydroxybutyric acid, mevalonic acid and salicylic acid.
10. A method for producing a crystalline form of a salt of mevalonic acid (X-MVA) from an aqueous solution, comprising subjecting the aqueous solution comprising said salt of mevalonic acid to a purification step, whereby said purification step produces a purified solution comprising X-MVA of a purity of at least 60%, preferable between 60-99%, and crystallizing said salt of mevalonic acid from said purified solution by water solvent crystallization.
11. The method of claim 10, wherein said purification step comprises subjecting the aqueous solution comprising said salt of mevalonic acid to a nanofiltration to produce a permeate, wherein said permeate comprises X-MVA at a purity of at least 60%.
11b. A method for producing a crystalline form of a salt of mevalonic acid from an aqueous solution, comprising subjecting the aqueous solution comprising said salt of mevalonic acid (X-MVA) to a nanofiltration to produce a permeate and crystallizing said salt of mevalonic acid from said permeate by water solvent crystallization.
12. The method of embodiments 10, 11 and 11b, wherein the water solvent crystallization comprises evaporating the purified solution or permeate to obtain a syrup comprising at least 60% DS, followed by cooling said syrup to produce X-MVA crystals.
12 b. The method of embodiment 11b, wherein the permeate has a X-MVA purity of at least 60%, optionally between 65-95%.
12 c. The method of embodiment 12, wherein the syrup has a X-MVA purity of at least 60%, optionally between 65-95%.
13. The method of embodiment 10, wherein the aqueous solution is a fermentation broth.
14. The method embodiment 13, wherein the fermentation broth is clarified by removing biomass and any solids from said fermentation broth by at least one of precoat filtration, microfiltration, or ultrafiltration.
15. The method of embodiment 13, wherein the fermentation broth is a broth obtained from an *Escherichia coli* fermentation.
16. The method of embodiment 12, further comprising removing said crystals from said syrup by filtration and centrifugation.
16b. The method of embodiment 11, wherein the nanofiltration utilizes nanofiltration membranes having a separation cut-off of from about 150 Da to about 700 Da.
17. The method of embodiment 10, wherein the nanofiltration utilizes nanofiltration membranes capable of retaining at least 60-98% divalent salts by weight, while having a monovalent salt rejection of less than 30% by weight.
18. A method for producing a water solubilized mevalonolactone from an aqueous solution wherein the method comprises:
   a) producing a crystalline form of a salt of mevalonic acid (X-MVA) from an aqueous solution by subjecting the aqueous solution comprising said salt of mevalonic acid to a nanofiltration to produce a permeate and crystallizing said salt of mevalonic acid from said permeate by water solvent crystallization to produce crystals of said salt of mevalonic acid; and,
   b) dissolving the crystals of (a) in water to produce a water solubilized salt of mevalonic acid and subjecting said liquid to cation exchange thereby converting said water solubilized salt of mevalonic acid to water solubilized mevalonolactone.
18 b. The method of embodiment 18, wherein the permeate has a X-MVA purity of at least 60%, optionally between 65-95%.
18 c. The method of embodiment 18, wherein the permeate is concentrated to produce a syrup prior to crystallizing said salt of mevalonic acid from said syrup by water solvent crystallization to produce crystals of said salt of mevalonic acid.
18 d. The method of embodiment 18c, wherein the syrup has a X-MVA purity of at least 60%, optionally between 65-95%.
18 e. The method of embodiment 18, wherein the water solubilized mevalonolactone—has a purity of at least 60%, optionally between 65-95%.
18 f. The method of embodiment 18, wherein the water solubilized mevalonolactone of b) is further concentrated to produce a highly concentrated MVL liquid of at least 90% DS.
19. The method of embodiment 10 or embodiment 18, wherein said salt of mevalonic acid salt is selected from the group consisting of Na-mevalonate (Na-MVA), K-mevalonate (K-MVA), ammonium mevalonate ($NH_4$-MVA), lithium-mevalonate (Li-MVA), any other monovalent salt of mevalonic acid, or any one combination thereof.
20. The method of embodiments 18, 18b, 18c, 18d, 18e, 18f, or 19, wherein said water solubilized mevalonolactone has a purity of at least 90% (the percentage being the peak area corresponding to MVL relative to the total area of peaks using HPLC analysis).

21. A method for producing mevalonolactone from an aqueous solution comprising a salt of mevalonic acid salt (X-MVA)), comprising subjecting the aqueous solution comprising said salt of mevalonate to cation exchange thereby converting said aqueous solution comprising a salt of mevalonate to an aqueous solution comprising mevalonolactone (MVL).

22. The method of embodiment 21, wherein said salt of mevalonic acid salt is selected from the group consisting of Na-mevalonate (Na-MVA), K-mevalonate (K-MVA), ammonium mevalonate ($NH_4$-MVA), lithium-mevalonate (Li-MVA), any other monovalent salt of mevalonic acid, or any one combination thereof.

23. The method of embodiment 21, further comprising concentrating said aqueous solution comprising mevalonolactone to a liquid comprising at least 65% to 90% DS.

24. The method of embodiment 23, further comprising cooling said liquid at 0-25° C. to obtain mevalonolactone monohydrate (MVL*$H_2O$) crystals.

25. The method of claim 24, further comprising dissolving/solubilizing said MVL*$H_2O$ crystals into water to obtain a dilute liquid of a highly purified mevalonolactone, wherein the dilute liquid has a mevalonolactone purity of at least 90% (the percentage being the peak area corresponding to MVL relative to the total area of peaks using HPLC analysis).

25b. The method of claim 25, wherein the dilute liquid comprising said highly purified mevalonolactone is further concentrated to produce a highly concentrated MVL liquid of at least 90% DS.

26. The method of embodiment 21, wherein the aqueous solution is a fermentation broth.

27. The method embodiment 26, wherein the fermentation broth is clarified by removing biomass and any solids from said fermentation broth by at least one of precoat filtration, microfiltration, or ultrafiltration.

28. The method of embodiment 26, wherein the fermentation broth is a broth obtained from an *Escherichia coli* fermentation.

29. A pharmaceutical or home care or nutritional or personal care or cosmetic composition comprising the MVL, or a solubilized form thereof, produced from any of embodiments 20-26.

30. A crystalline X-MVA obtained from a method of any of embodiments 1-17.

31. A crystalline mevalonolactone*monohydrate (MVL*$H_2O$) obtained from a method of embodiment 24.

32. A crystalline mevalonolactone*monohydrate (MVL*$H_2O$) with molecular formula of $C_6H_{10}O_3$*$H_2O$.

33. A crystalline mevalonolactone*monohydrate (MVL*$H_2O$) with a melting point below 25° C.

34. A composition comprising mevalonolactone monohydrate (MVL*$H_2O$) crystals.

35. A composition comprising solubilized mevalonolactone monohydrate (MVL*$H_2O$) crystals.

EXAMPLES

In the following Examples, unless otherwise stated, parts and percentages are by weight and degrees are Celsius. It should be understood that these Examples, while indicating embodiments of the disclosure, are given by way of illustration only. From the above discussion and these Examples, one skilled in the art can make various changes and modifications of the disclosure to adapt it to various usages and conditions. Such modifications are also intended to fall within the scope of the appended claims.

Example 1

Sodium Mevalonate (Na-MVA) Liquid Nanofiltration (NF) with Tight Nanofiltration Membranes This example describes the nanofiltration of an aqueous solution comprising an organic acid or salt thereof, such as sodium mevalonate (Na-MVA) liquid nanofiltration using a tight nanofiltration membrane.

The process equipment included a plate and frame filtration unit (Alfa Laval Labstak M20), feed and diafiltration pump, heat exchanger, cooling unit, 70-liter feed tank as well as inlet and outlet pressure gauges and pressure control valve. The total membrane area was 0.65 $m^2$. The membranes installed were, Desal-5 DL (Suez, approximate molecular weight cut-off of 150-300 Dalton, >98% $MgSO_4$ retention at 25° C.) and XN45 (TrSep®/Microdyn Nadir, approximate molecular weight cut-off of 300-500 Dalton, 90-96% $MgSO_4$ retention at 25° C.). $MgSO_4$ retention specified at 1-2 g/l concentration in 7-8 bar, 25° C., pH 6-8 and 10-25% recovery.

Ultrafiltration permeate from *Escherichia Coli* based fermentation of sodium mevalonate was used as a feed. The aim was to pass the sodium mevalonate while retaining impurities (other salts, color, antifoam, protein).

63.4 kg of feed was fed into a 70-liter feed tank. The dry feed concentration was 6.8 g/100 g based on sucrose RDS, conductivity was 17.7 mS/cm and the pH was 7.8. Permeate was collected from DL membranes and permeate from XN45 membranes was recycled back to the feed tank. The feed was composed as set shown in Table 1, wherein the HPLC and IC analyses are given on %/sucrose RDS basis.

TABLE 1

| Feed composition (%) | |
| --- | --- |
| Sodium mevalonate, % | 66.4 |
| Glucose, %* | 0.6 |
| Acetate, %** | 2.1 |
| Phosphate, %** | 1.6 |
| Sulphate, %** | 0.5 |
| Others, % | 28.8 |

*HPLC (Rezex ROA-Organic Acid H+ (8%) column).
**Ion chromatography

The feed was kept at 50-68° C. and water was used for diafiltration. The filtration pressure was 20-33 Bar and concentrate DS (dry substance) concentration controlled to keep flux above 7 kg/$m^2$/h (the minimum flux point observed).

After batch filtration, three permeate fractions and a final concentrate fraction were collected. The result including HPLC and IC analyses on %/sucrose RDS basis for the permeate fraction and final concentrate are shown in Table 2.

TABLE 2

HPLC analysis

| | Total permeate 1 | Total permeate 2 | Total permeate 3 | Final concentrate |
|---|---|---|---|---|
| mass, kg | 31.0 | 31.6 | 4.5 | 17.1 |
| Dry solids, g/100 g | 2.0 | 3.6 | 3.4 | 13.9 |
| Conductivity mS/cm | 8.1 | 11.3 | 10.9 | 26.2 |
| Sodium mevalonate, %* | 52.1 | 86.9 | 86.2 | 63.3 |
| Glucose, %* | 1.2 | 2.0 | 0.9 | 0.4 |
| Acetate, %** | 7.6 | 2.7 | 0.7 | 0.3 |
| Phosphate, %** | 0.5 | 0.8 | 1.1 | 2.0 |
| Sulphate, %** | 0.1 | 0.1 | 0.1 | 0.8 |
| Others, % | 38.6 | 7.5 | 11.0 | 33.2 |

*HPLC (Rezex ROA-Organic Acid H+ (8%) column).
**Ion chromatography

The overall mevalonate yield calculated was 49.9%. Average permeate sodium mevalonate purity was 75.6%.

Sulfate removal was 78.1% and phosphate removal was 71.0% calculated from feed and concentrate samples. Sodium mevalonate retention was measured from 5 points for DL membranes and average values was 76.7%. DL and XN45 mevalonate retentions were measured in parallel from the 4$^{th}$ sample point after 41 kg permeate was collected and retentions were 71.0% and 41.8% for DL and XN45 respectively.

Example 2

Sodium Mevalonate Liquid Nanofiltration with Open Nanofiltration (NF) Membranes

This example describes the nanofiltration an aqueous solution comprising an organic acid or salt thereof, such as sodium mevalonate liquid nanofiltration using open nanofiltration membranes.

The process equipment included a plate and frame filtration unit (Alfa Laval Labstak M20), feed and diafiltration pump, heat exchanger, cooling unit, 100-liter feed tank as well as inlet and outlet pressure gauges and pressure control valve. The total membrane area was 0.72 m$^2$. The membranes installed were, XN45 (TriSep®/Microdyn Nadir, approximate molecular weight cut-off of 300-500 Dalton, 90-96% MgSO$_4$ retention at 25° C.). MgSO$_4$ retention specified at 1-2 g/l concentration in 7-8 bar, 25° C., pH 6-8 and 10-25% recovery.

Ultrafiltration permeate from *Escherichia Coli* based fermentation of sodium mevalonate was used as a feed. The aim was to pass the sodium mevalonate while retaining impurities (other salts, color, antifoam, protein).

80.0 kg of feed was fed into a 100-liter feed tank. The feed concentration was 6.6 g/100 g based on sucrose RDS. pH was adjusted with NaOH to 8.8. Antifoam Foamblast 882 concentration was measured to be 1337 mg/L. The feed was composed as shown in Table 3, wherein the HPLC and IC analyses are given on %/sucrose RDS basis.

TABLE 3

Feed composition (%)

| | |
|---|---|
| Sodium mevalonate, %* | 55.6 |
| Glucose, %* | 0.8 |
| Acetate, %** | 2.2 |
| Phosphate, %** | 1.1 |
| Sulphate, %** | 0.5 |
| Others, % | 39.8 |

*HPLC (Rezex ROA-Organic Acid H+ (8%) column).
**Ion chromatography

The feed was kept at 46-51° C. The filtration pressure was 10-25 Bar used to control flux above 7 kg/m$^2$/h (the minimum flux point observed).

After batch filtration, two permeate fractions and final concentrate fraction were collected. The result including HPLC and IC analyses on %/sucrose RDS basis for the permeate fraction and final concentrate are shown in Table 4.

TABLE 4

HPLC analysis

| | Total permeate 1 | Total permeate 2 | Final concentrate |
|---|---|---|---|
| mass, kg | 67.3 | 9.5 | 5.3 |
| Dry solids, g/100 g | 4.1 | 8.6 | 16.3 |
| Sodium mevalonate, %* | 65.3 | 69.3 | 35.1 |
| Glucose, %* | 1.0 | 0.7 | 0.6 |
| Acetate, %** | 3.4 | 1.3 | 0.3 |
| Phosphate, %** | 0.4 | 0.6 | 2.3 |
| Sulphate, %** | 0.2 | 0.1 | 0.9 |
| Others, % | 29.7 | 28.0 | 60.8 |

*HPLC (Rezex ROA-Organic Acid H+ (8%) column).
**Ion chromatography

The overall mevalonate yield calculated was 82.1%. Antifoam concentration measured from evaporated permeate sample in 29.5% concentration was 84.4 mg/l meaning 99% antifoam removal from product permeate fraction. Final concentrate antifoam concentration measured was 13230.0 mg/l. Sodium mevalonate retention was measured from 3 points and average value was 23.6%.

Example 3

Sodium Mevalonate Liquid Nanofiltration with Open Nanofiltration (NF) Membranes

This example describes the nanofiltration an aqueous solution comprising an organic acid or salt thereof, such as sodium mevalonate liquid nanofiltration using open nanofiltration membranes.

The process equipment included a plate and frame filtration unit (Alfa Laval Labstak M20), feed and diafiltration pump, heat exchanger, cooling unit, 100-liter feed tank as well as inlet and outlet pressure gauges and pressure control valve. The total membrane area was 0.72 m$^2$. The membranes installed were, XN45 (TriSep®/Microdyn Nadir, approximate molecular weight cut-off of 300-500 Dalton, 90-96% MgSO$_4$ retention at 25° C.). MgSO$_4$ retention specified at 1-2 g/l concentration in 7-8 bar, 25° C., pH 6-8 and 10-25% recovery.

Ultrafiltration permeate from *Escherichia Coli* based fermentation of sodium mevalonate was used as a feed. The aim was to pass the sodium mevalonate while retaining impurities (other salts, color, antifoam, protein).

79.7 kg of feed was fed into a 100-liter feed tank. The feed concentration was 7.0 g/100 g. pH was adjusted with 50 grams of 30% NaOH to 8.25. The feed was composed as shown in Table 5, wherein the HPLC analyses are given on %/sucrose RDS basis (Table 6).

TABLE 5

| Feed composition (%) | |
| --- | --- |
| Sodium mevalonate, %* | 65.1 |
| Glucose, %* | 0.0 |
| Acetate, %** | 1.8 |
| Phosphate, %** | 0.3 |
| Sulphate, %** | 0.5 |
| Others, % | 32.3 |

*HPLC (Rezex ROA-Organic Acid H+ (8%) column).
**Ion chromatography

The feed was kept at 46-51° C. The filtration pressure was 10-25 Bar used to control flux above 7 kg/m$^2$/h (the minimum flux point observed).

After batch filtration, permeate fraction and final concentrate fraction were collected. Part of total permeate was evaporated to 28.7% dry solids. The result including HPLC analyses on %/sucrose RDS basis for the permeate fraction and final concentrate are shown in Table 6.

TABLE 6

| | HPLC analysis | | |
| --- | --- | --- | --- |
| | Total permeate | Final concentrate | Evaporated permeate |
| mass, kg | 75.0 | 4.7 | — |
| Dry solids, g/100 g | 6.1 | 17.6 | 30.2 |
| Sodium mevalonate, %* | 69.3 | 47.6 | 75.1 |
| Acetate, %** | 2.1 | 0.4 | 2.5 |
| Phosphate, %** | 0.1 | 0.5 | 0.2 |
| Sulphate, %** | 0.3 | 0.9 | 0.4 |
| Others, % | 28.3 | 50.5 | 21.8 |

*HPLC (Rezex ROA-Organic Acid H+ (8%) column),
**IC

The overall mevalonate yield calculated was 86.8%.

Example 4

Sodium Mevalonate Liquid Nanofiltration with Open Spiral Wound Nanofiltration (NF) Membranes This example describes the nanofiltration of an aqueous solution comprising an organic acid or salt thereof, such as sodium mevalonate liquid nanofiltration using open spiral wound nanofiltration membranes.

The process equipment included a plate and frame filtration unit (Alfa Laval Labstak M20), feed and diafiltration pump, heat exchanger, cooling unit, 1000-liter feed tank as well as inlet and outlet pressure gauges and pressure control valve. The total membrane area was 14.8 m$^2$. The membranes installed were, 4040 XN45 with 31 mil spacer (TriSep®/Microdyn Nadir, approximate molecular weight cut-off of 300-500 Dalton, 90-96% MgSO$_4$ retention at 25° C.). MgSO$_4$ retention specified at 1-2 g/l concentration in 7-8 bar, 25° C., pH 6-8 and 10-25% recovery.

Ultrafiltration permeate from *Escherichia Coli* based fermentation of sodium mevalonate was used as a feed. The aim was to pass the sodium mevalonate while retaining impurities (other salts, color, antifoam, protein).

600 kg of feed was fed into a 1000-liter feed tank. The feed concentration was 6.7 g/100 g. pH was adjusted with 30% NaOH to 8.5. The feed was composed as shown in Table 7, wherein the HPLC analyses are given on %/sucrose RDS basis.

TABLE 7

| Feed composition (%) | |
| --- | --- |
| Sodium mevalonate, % | 64.5 |
| Acetate, % | 1.2 |
| Others, % | 34.3 |

The feed was kept in 45-52° C. The filtration pressure was 10-25 Bar used to control flux above 5 kg/m$^2$/h (the minimum flux point observed).

After batch filtration, permeate fraction and final concentrate fraction were collected. Total permeate was evaporated to 39.1% dry solids. The result including HPLC analyses on %/sucrose RDS basis for the permeate fraction and final concentrate are shown in Table 8.

TABLE 8

| | HPLC analysis | | |
| --- | --- | --- | --- |
| | Total permeate | Final concentrate | Evaporated permeate |
| mass, kg | 606.0 | 45 | — |
| Dry solids, g/100 g | 5.5 | 16.7 | 39.1 |
| Sodium mevalonate, % | 68.8 | 52.2 | 75.5 |
| Acetate, % | 1.8 | 0.7 | 1.9 |
| Others, % | 29.4 | 47.1 | 22.6 |

The overall mevalonate yield calculated was 87.5%.

Example 5

Water Solvent Crystallization of Sodium Mevalonate (Na-MVA)

This example describes the water solvent crystallization of organic acids or salts thereof, such as water solvent crystallization of sodium mevalonate (Na-MVA), and preparation of sodium mevalonate seed crystals.

The crystallization feed material was an aqueous syrup comprising sodium mevalonate. The sodium mevalonate purity of the syrup was 96% on DS. An aqueous syrup comprising sodium mevalonate ≥95% on DS can be produced by dissolving known, commercially available, sodium mevalonate salt in deionized water or by mixing known, commercially available, sodium mevalonate salt with nanofiltration permeate, comprising sodium mevalonate, prepared in accordance with Examples 1-4.

The feed syrup was evaporated (Rotavapor R-151) at a temperature of 70° C. When the DS (dry substance) was about 54%, crystals formed by spontaneous nucleation. Evaporation was continued after nucleation at 70° C. for hr. until the DS of the crystal mass was 81.8%.

The evaporated crystal mass was moved to a 2-liter cooling crystallizer. The crystal mass was kept at 70° C. for 1 hr., and then cooled to a temperature of 40° C. within 20 hr. under continuous stirring.

930 g of the resulting crystal mass was centrifuged with 20 mL wash water (batch-wise centrifuge, basket diameter 22.5 cm, 3500 rpm, 5 min). The mevalonate yield in centrifugation was 45%, the sodium mevalonate purity of the centrifugation cake was ≥98% on DS, and the sodium mevalonate purity of the centrifugation mother liquor was 94% on DS.

The crystal cake was dried in a heating chamber at 60° C. for 19 hr. The water content of the dried cake was ≤0.2 wt. %.

Sodium mevalonate crystals prepared in accordance with this process were used as seed crystals in Examples 6, 7, and 8. Before being used, the crystals were grinded in a porcelain mill.

Example 6

Water Solvent Crystallization of Sodium Mevalonate (Na-MVA)

This example describes the water solvent crystallization of organic acids or salts thereof, such as water solvent crystallization of sodium mevalonate (Na-MVA).

The crystallization feed material was evaporated nanofiltration permeate, prepared in accordance with Example 4. Before crystallization, the syrup was treated with active carbon powder to remove color. The carbon treatment was carried out by dosing 600 g of Norit DX 1 carbon powder to 76 kg of evaporated syrup (about 20 g of carbon powder per 1 kg of DS). The syrup was heated to a temperature of 50° C. and kept stirring at constant temperature for 45 min. The carbon powder was then separated from the syrup with filter aid filtration (Seitz depth filter, 1.1 kg of Kenite 300 filter aid). The sodium mevalonate purity of the resulting syrup was 73% on DS, the color was 6300 ICUMSA, and the DS was 24.1%.

41 kg of the carbon treated feed syrup was evaporated to a DS of 86.0% (Luwa thin film evaporator NL3-210/1600/10 and Rotavapor R-153 evaporator). 4 g of 10% Struktol J 650 antifoam was added during evaporation to avoid foaming. 11.6 kg of the resulting syrup was moved to a 10-liter cooling crystallizer and seeded two times at a temperature of 70° C.: at first, with 0.3 g of sodium mevalonate dry seed (prepared in accordance with Example 5), and then with 2.0 g of sodium mevalonate dry seed after 0.6 hr from the first seeding. The first seeding resulted in very little crystal formation.

The seeded syrup was cooled to a temperature of 48° C. within 16 hr under continuous stirring. After cooling to 48° C., the crystal mass was kept at 48° C. for hr.

10.7 kg of the resulting crystal mass was centrifuged with 170 mL wash water (batch-wise centrifuge, basket diameter 40.5 cm, 2050 rpm, 10 min). The mevalonate yield in centrifugation was 33%. The sodium mevalonate purity of the centrifugation cake was 94% on DS, the water content of the non-dried cake was 5.3 wt. %, and the color was 5200 ICUMSA. The sodium mevalonate purity of the centrifugation mother liquor was 68% on DS and the color was 82000 ICUMSA.

Example 7

Water Solvent Crystallization of Sodium Mevalonate (Na-MVA)

This example describes the water solvent crystallization of organic acids or salts thereof, such as water solvent crystallization of sodium mevalonate (MVA).

The crystallization feed material was evaporated nanofiltration permeate, prepared in accordance with Example 4, which was treated with active carbon in accordance with the procedure described in Example 6 (20 g of Norit DX 1 carbon powder per 1 kg of DS, contact time 45 min, contact temperature 50° C., carbon powder separated by using Seitz depth filter with Kenite 300 filter aid). The sodium mevalonate purity of the feed was 73% on DS and the color was 6300 ICUMSA.

The feed syrup was evaporated to a DS of 86.2% (Luwa thin film evaporator NL3-21011600/10 evaporator and Rotavapor R-153 evaporator). 11.7 kg of the resulting syrup was moved to a 10-liter cooling crystallizer and seeded with 2.0 g of sodium mevalonate dry seed (prepared in accordance with Example 5) at a temperature of 69° C. The seeded syrup was cooled to a temperature of 44° C. within 16 hr under continuous stirring. The crystal mass was then diluted to a DS of 85.4% by adding deionized water. The diluted crystal mass was cooled to a temperature of 40° C. within 3 hr and kept at 40° C. for 2 hr.

10.9 kg of the resulting crystal mass was centrifuged with 170 mL wash water (batch-wise centrifuge, basket diameter 40.5 cm, 2050 rpm, 10 min). The mevalonate yield in centrifugation was 37%. The sodium mevalonate purity of the centrifugation cake was 95% on DS, the water content of the non-dried cake was 7.0 wt. %, and the color was 1100 ICUMSA. The sodium mevalonate purity of the centrifugation mother liquor was 67% on DS and the color was 14000 ICUMSA.

Example 8

Water Solvent Crystallization of Sodium Mevalonate (Na-MVA)

This example describes the water solvent crystallization of organic acids or salts thereof, such as water solvent crystallization of sodium mevalonate (Na-MVA), from a syrup prepared by dissolving crystal cake in deionized water.

Sodium mevalonate crystals from Example 6 and Example 7 were combined and dissolved in deionized water. The resulting solution was treated with active carbon in accordance with the procedure described in Example 6 (20 g of Norit DX 1 carbon powder per 1 kg of DS, contact time 45 min, contact temperature 50° C., carbon powder separated by using Buchner filtration with Kenite 300 filter aid), filtered through a 0.2 μm sterile filter, and evaporated to a DS of 83.5% (Rotavapor R-151 evaporator). The sodium mevalonate purity of the syrup was 96% on DS and the color was 1300 ICUMSA.

5.6 kg of the evaporated syrup was moved to a 6-liter cooling crystallizer and seeded with 1.6 g of sodium mevalonate dry seed (prepared in accordance with Example 5) at a temperature of 68° C. The seeded syrup was cooled to a temperature of 40° C. within 18 hr under continuous stirring. After cooling to 40° C., the crystal mass was kept at 40° C. for 4 hr.

5.1 kg of the resulting crystal mass was centrifuged with 150 mL wash water (batch-wise centrifuge, basket diameter 40.5 cm, 2050 rpm, 10 min). The mevalonate yield in centrifugation was 42%. The sodium mevalonate purity of the centrifugation cake was ≥98% on DS, the water content of the non-dried cake was 1.5 wt. %, and the color was 100 ICUMSA. The sodium mevalonate purity of the centrifugation mother liquor was 94% on DS and the color was 3400 ICUMSA.

Example 9

Cation Exchange of Crystallized Na-MVA to Mevalonolactone (MVL)

This example describes the cation exchange of a liquid solution of dissolved Na-MVA crystals to produce a dilute liquid comprising mevalonate (MVL), which can optionally be concentrated by evaporation (see also FIG. 1B).

The process equipment included a jacketed glass column with 45 mm inner diameter and 1000 mm total length, a feed vessel placed above the column, a peristaltic pump on the output of the column and a Büchi rotavapor R200 rotary lab evaporator. 1 liter of Dowex 88 Strong acid cation ion exchange resin was loaded into the column to give about 700 mm bed length. Resin was backwashed and regenerated to H$^+$-form by using 4 liters (4 Bed volumes) of 5% $H_2SO_4$ at a flow rate of 2 BV/h in 25° C. temperature.

Sodium mevalonate crystals from a water based crystallization process with about 98%/DS purity were dissolved in water to form a 24.2% solution. The aim was to exchange the sodium cation and produce a pure mevalonic acid or mevalonolactone syrup.

A feed solution of 957 grams was passed through the column at room temperature (about 25° C.) at a rate of 1 BV/h and elution continued using water. pH of feed was 9.78 and conductivity 39.4 mS/cm. Product collection was started when column output brix was 0.4% and ended when output brix was 1.2%. 1322 grams of product was collected with slight coloring. The columns were again regenerated to H*-form and material was passed through to column in room temperature (about 25° C.) at a rate of 1 BV/h. Product collection was started when column output brix was 3.0% and ended when output brix was 1.4%. 1641 grams of product with no color was collected. The material was evaporated in a rotary evaporator to 99.1% KF-DS with 95.5%/DS MVL purity.

The results including HPLC analyses on %/dry substance basis for the feed and ion exchange (IEX) products are shown in Table 9.

TABLE 9

| HPLC analysis | | | |
| --- | --- | --- | --- |
| | Feed | IEX product 1 | IEX product 2 |
| mass, g | 957.4 | 1322.0 | 1641.0 |
| Dry solids, g/100 g (KF-DS) | 24.2 | 13.7 | 10.4 |
| Conductivity mS/cm | 39.4 | 2.5 | 4.5 |
| pH | 9.8 | 2.9 | 1.8 |
| Mevalonolactone, % | 75.0 | 94.3 | 97.6 |
| Others in HPLC, % | 1.5 | 2.3 | 2.3 |

The overall mevalonolactone yield calculated for the IEX process was 95.6%.

The specific optical rotation of a syrup comprising mevalonolactone produced in accordance with this process was −34.7° (water, c=1, 20° C.).

Example 10

Cation Exchange of Na-MVA Solutions to Mevalonolactone (MVL)

This example describes the cation exchange of an aqueous solution containing Na-MVA to produce an aqueous comprising mevalonate (MVL)), which can optionally be concentrated by evaporation (see also FIG. 2).

The process equipment included 100 liter tank, Seitz depth filter, three jacketed glass columns with 130 mm inner diameter and 1500 mm total length, a feed vessel placed above the column, a peristaltic pump on the output of the column and a LUWA wiped film evaporator. 13 liters of Dowex 88 Strong acid cation ion exchange resin (Dow) was loaded into each of the columns to give about 1000 mm bed length. Resins were backwashed and regenerated in series to H*-form by using 130 liters (about 3.3 Bed volumes) of 5% $H_2SO_4$ at a flow rate of 2 BV/h in 25° C. temperature.

The aim was to exchange the sodium cation and produce a mevalonic acid or mevalonolactone syrup for further purification. Powdered active carbon was used to remove color on possible precipitation from the IEX feed.

Nanofiltration permeate having 75.5%/DS Na-MVA purity and 10986 ICUMSA unit color was evaporated to 39.1% brix. 76.2 kg of the solution was heated to 50-60° C. temperature and 2%/DS of Norit DX1 powdered active carbon was added and mixed for 45 min. The suspension was filtered using Seitz depth filter with T2600 filtration sheets (Pall) with 0.56 m$^2$ filtration area and 1 kg/m$^2$ of Kenite 300 (IMERYS Filtration) diatomaceous earth filter aid as pre-coat. 110 liters of Filtrate with 24.1% brix was evaporated to 53% brix solution with 6496 ICUMSA unit color. 14.8 kg of this Material was diluted to 39.8% brix for IEX feed and heated to 50° C.

A feed solution of 20.05 kg was passed through to columns at 50° C. at a rate of 2 BV/h and elution continued using water. Product collection was started when last column output brix was 0.5% and ended when output brix was 4.0% and pH 2.5. Product was collected to two fractions. Fractions were combined and evaporated. Evaporated combined IEX product had color of 2362 ICUMSA units and MVL purity of about 76%/DS The results of the feed and IEX products are set forth in Table 10.

TABLE 10

| Feed and IEX products | | | |
| --- | --- | --- | --- |
| | Feed | IEX product 1 | IEX product 2 |
| mass, kg | 20.1 | 18.1 | 17.9 |
| Dry solids, (KF-DS) | 39.8 | 12.0 | 22.7 |
| Conductivity mS/cm | 32.3 | 4.1 | 3.9 |
| pH | 8.5 | 1.9 | 1.8 |

Example 11

Cation Exchange of Na-MVA Solutions to Mevalonolactone (MVL)

This example describes the cation exchange of an aqueous solution containing Na-MVA to produce an aqueous comprising mevalonate (MVL), which can optionally be concentrated by evaporation (see also FIG. 2).

The process equipment included 100 liter tank, Seitz depth filter, three jacketed glass columns with 130 mm inner diameter and 1500 mm total length, a feed vessel placed above the column, a peristaltic pump on the output of the column and a LUWA wiped film evaporator. 13 liters of Dowex 88 Strong acid cation ion exchange resin (Dow) was loaded into each of the columns to give about 1000 mm bed length. Resins were backwashed and regenerated in series to H*-form by using liters (about 3.3 Bed volumes) of 5% $H_2SO_4$ at a flow rate of 2 BV/h in 25° C. temperature.

The aim was to exchange the sodium cation and produce a mevalonic acid or mevalonolactone syrup for further purification. Powdered active carbon was used to remove color on possible precipitation from the IEX feed.

Nanofiltration permeate having 78.8%/DS Na-MVA purity and 8887 ICUMSA unit color was evaporated to 42.0% brix. 41.4 kg of the solution was heated to 55-58° C. temperature and 2.2%/DS of Norit DX1 powdered active carbon was added and mixed for 70 min. The suspension was filtered using Seitz depth filter with T2600 filtration sheets (Pall) with 0.28 m² filtration area and 1 kg/m² of Kenite 300 (IMERYS Filtration) diatomaceous earth filter aid as pre-coat. 56 liters of Filtrate with 23.8% brix and 2124 ICUMSA unit color. Material was evaporated to 31.1% brix for IEX feed.

A feed solution of 35.7 kg was passed through to columns at 25° C. at a rate of BV/h and elution continued using water. Product collection was started when last column output brix was 0.5% and ended when output brix was 2.0% and pH reached 2.5. Product and residual fractions were collected. Evaporated IEX product had MVL purity of about 78-83%/DS. The results the feed and IEX products are set forth in the Table 11.

TABLE 11

Feed and IEX products

|  | Feed | IEX product | Residual Fraction |
|---|---|---|---|
| mass, kg | 35.7 | 34.1 | 14.3 |
| Dry solids, (KF-DS) | 31.1 | 18.0 | 16.4 |
| Conductivity mS/cm | 42.8 | 6.9 | 6.8 |
| pH | 7.6 | 1.7 | 3.6 |

Example 12

Cation Exchange of Na-MVA Solutions to Mevalonolactone (MVL)

This example describes the cation exchange of an aqueous solution containing Na-MVA to produce an aqueous comprising mevalonate (MVL), which can optionally be concentrated by evaporation (see also FIG. 2).

The process equipment included three jacketed glass columns with 130 mm inner diameter and 1500 mm total length, a feed vessel placed above the column, a peristaltic pump on the output of the column. 13 liters of Dowex 88 Strong acid cation ion exchange resin (Dow) was loaded into each of the columns to give about 1000 mm bed length. Resins were backwashed and regenerated in series to H*-form by using 130 liters (about 3.3 Bed volumes) of 5% $H_2SO_4$ at a flow rate of 2 BV/h in 25° C. temperature.

The aim was to exchange the sodium cation and produce a mevalonic acid or mevalonolactone syrup for further purification.

Na-MVA crystallization end mother liquor with 68.2% DS Na-MVA purity and ICUMSA unit color was diluted to 39.4% brix.

A feed solution of 17.0 kg was passed through to column in 25° C. at a rate of BV/h and elution continued using water. Product collection was started when last column output brix was 0.8% and ended when output brix was 2.0%. Product was collected to three fractions. Fractions were combined and evaporated. Evaporated combined IEX product had MVL purity of about 70-73%/DS The results the feed and IEX products are set forth in Table 12.

TABLE 12

Feed and IEX products

|  | Feed | IEX product 1 | IEX product 2 | IEX product 3 |
|---|---|---|---|---|
| mass, kg | 17.0 | 18.5 | 10.6 | 6.9 |
| Dry solids, (KF-DS) | 39.4 | 16.7 | 17.4 | 5.1 |
| Conductivity mS/cm | 33.1 | 5.9 | 4.3 | 1.3 |
| pH | 7.3 | 1.7 | 1.8 | 2.4 |

Example 13

Water Solvent Crystallization of Mevalonolactone Monohydrate and Preparation of MVL*H$_2$O Seed Crystals This example describes the water solvent crystallization of mevalonolactone monohydrate and preparation of mevalonolactone monohydrate seed crystals.

A high purity syrup of MVL was prepared by methods as described herein (FIGS. 1A and 1B, Examples 1-9). Unexpectedly and surprisingly, it was observed that when this high MVL purity syrup was cold stored (at about 6° C.) for several weeks, mevalonolactone monohydrate (MVL*H$_2$O) crystals formed spontaneously by itself.

The MVL purity of the syrup, 98% of DS (HPLC, resins in H+ form, Area %), and water content, about 6% w/w, were high enough to make MVL*H$_2$O crystallization possible.

The crystals were filtered and centrifuged (2 min with 570 g at about 15° C.) in a filtration tube to remove mother liquid from the crystal surfaces. Thereafter these crystals and the mother liquid were analyzed. The water content of the crystals, 10.8% (by Karl-Fisher method), was a bit lower than theoretical 12.1% due to the crystallization conditions. The water content of the mother liquid was 3.2% which means that mother liquid has been concentrating during the monohydrate crystal formation. The MVL purity of the crystals was 98.8% of DS and mother liquid 97.7%/DS. These MVL*H$_2$O crystals were used as seed crystals in Example 14. Before being used, the crystals were grinded in a porcelain mill.

Example 14

Water Solvent Crystallization of Mevalonolactone Monohydrate

This example describes the water solvent crystallization of mevalonolactone monohydrate from a mevalonolactone syrup produced by subjecting sodium mevalonate crystallization mother liquor to cation exchange.

The centrifugation mother liquor from Example 6, comprising sodium mevalonate, was treated with cation exchange in accordance with Example 12 to obtain a liquid comprising mevalonolactone. The mevalonolactone purity of the resulting syrup was 71% on DS and the color was 34000 ICUMSA.

The feed syrup was evaporated to a DS of 93.7% (Rotavapor R-153 evaporator). 2.1 kg of the resulting syrup was moved to a 2-liter cooling crystallizer and seeded with 0.4 g of mevalonolactone monohydrate dry seed (prepared in accordance with Example 13) at a temperature of 11° C. The seeded syrup was cooled to a temperature of 7° C. within 16 hr under continuous stirring. After cooling to 7° C., the stirring was continued at 7° C. for 50 hr. Deionized water was added during the constant temperature period to dilute the crystal mass in the following three portions: (1) 40 g was added 23 hr after seeding, (2) 50 g was added 43 hr after seeding, and (3) 10 g was added 47 hr after seeding. The DS of the resulting crystal mass was 89.1%.

1.7 kg of the crystal mass was centrifuged in a batch-wise centrifuge without wash water (basket diameter 22.5 cm, 4000 rpm, 3 min). The mevalonolactone yield in centrifugation was 52%. The mevalonolactone purity of the centrifugation cake was 94% on DS, the water content of the non-dried cake was 10.8 wt. %, and the color was 5200 ICUMSA. The mevalonolactone purity of the centrifugation mother liquor was 56% on DS and the color was 52000 ICUMSA.

Mevalonolactone monohydrate crystals prepared in accordance with this process were used as seed crystals in Example 15. Before being used, the crystals were grinded in a porcelain mill.

Example 15

Water Solvent Crystallization of Mevalonolactone Monohydrate

This example describes the water solvent crystallization of mevalonolactone monohydrate from a syrup comprising mevalonolactone produced by using nanofiltration followed by a cation exchange step (FIG. 2).

Nanofiltration permeate prepared in accordance with Example 4, comprising sodium mevalonate, was treated with cation exchange in accordance with Example to obtain a liquid comprising mevalonolactone. The mevalonolactone purity of the resulting syrup was 76% on DS and the color was 2400 ICUMSA.

The feed syrup was evaporated to a DS of 90.7% (Rotavapor R-153 evaporator). 6.3 kg of the resulting syrup was moved to a 6-liter cooling crystallizer and seeded with 0.5 g of mevalonolactone monohydrate dry seed (prepared in accordance with Example 14) at a temperature of 12° C. The seeded syrup was cooled to a temperature of 6° C. within 17 hr under continuous stirring. After cooling to 6° C., the stirring was continued at 6° C. for 5 hr. Deionized water was added during the constant temperature period at 6° C. to dilute the crystal mass in the following three portions: (1) 50 g was added 18 hr after seeding, (2) 40 g was added hr after seeding, and (3) 70 g was added 20 hr after seeding. The DS of the resulting crystal mass was 88.1%.

5.2 kg of the resulting crystal mass was centrifuged in 4 batches using an amount of wash water equal to 27-33 m/kg mass DS (batch-wise centrifuge, basket diameter 22.5 cm, 3500 rpm, 3 min). A crystal cake sample and a mother liquor sample were collected from the first centrifugation. The mevalonolactone yield in the first centrifugation was 71%. The mevalonolactone purity of the first centrifugation cake was 93% on DS, the water content of the non-dried cake was 12.7 wt. %, and the color was 560 ICUMSA. The mevalonolactone purity of the first centrifugation mother liquor was 55% on DS and the color was 5700 ICUMSA.

Mevalonolactone monohydrate crystals prepared in accordance with this process were used as seed crystals in Examples 16 and 17. Before being used, the crystals were grinded in a porcelain mill.

Example 16

Water Solvent Crystallization of Mevalonolactone Monohydrate

This example describes the water solvent crystallization of mevalonolactone monohydrate from a syrup comprising mevalonolactone produced by using nanofiltration followed by a cation exchange step (FIG. 2).

Nanofiltration permeate prepared in accordance with Example 3, comprising Na-MVA, was treated with cation exchange in accordance with Example 11 to produce a liquid comprising MVL. The mevalonolactone purity of the resulting syrup was 81% on DS and the color was 1200 ICUMSA.

The feed syrup was evaporated to a DS of 84.1% (Rotavapor R-153 evaporator). 6.2 kg of the resulting syrup was moved to a 6-liter cooling crystallizer and seeded with 1.0 g of mevalonolactone monohydrate dry seed (prepared in accordance with Example 15) at a temperature of 16° C. The seeded syrup was kept at 16° C. for 3 hr and then cooled to a temperature of 6° C. within 11 hr under continuous stirring. After cooling to 6° C., the stirring was continued at 6° C. for 7 hr.

5.5 kg of the resulting crystal mass was centrifuged in 5 batches using an amount of wash water equal to 72-79 mL/kg mass DS (batch-wise centrifuge, basket diameter 22.5 cm, 3500 rpm, 3 min). A crystal cake sample and a mother liquor sample were collected from the first centrifugation. The mevalonolactone yield in the first centrifugation was 62%. The mevalonolactone purity of the first centrifugation cake was ≥97% on DS, the water content of the non-dried cake was 11.6 wt. %, and the color was 61 ICUMSA. The mevalonolactone purity of the first centrifugation mother liquor was 64% on DS and the color was 2700 ICUMSA.

Example 17

Water Solvent Crystallization of Mevalonolactone Monohydrate

This example describes the water solvent crystallization of mevalonolactone monohydrate from a mixture of centrifugation mother liquor and diluted crystal mass.

The crystallization feed material was an aqueous syrup comprising mevalonolactone. It was obtained by combining the centrifugation mother liquor and the diluted crystal mass recovered from washing the equipment with deionized water from Example 16. The mevalonolactone purity of the resulting syrup was 70% on DS and the color was 2400 ICUMSA.

The feed was evaporated to a DS of 85.3% (Rotavapor R-153), and 2.8 kg of the resulting syrup was moved to a 2-liter cooling crystallizer. The syrup was seeded two times: at first, with 1.0 g of mevalonolactone monohydrate dry seed (prepared in accordance with Example 15) at a temperature of 13° C., and then with 1.0 g of mevalonolactone monohydrate dry seed at a temperature of 10° C. The first seeding resulted in very little crystal formation.

The seeded syrup was kept at 10° C. for 35 min and then cooled to a temperature of 4° C. within 16 hr under continuous stirring. After cooling to 4° C., the stirring was continued at 4° C. for 2 hr.

2.5 kg of the resulting crystal mass was centrifuged in 2 batches (batch-wise centrifuge, basket diameter 22.5 cm, 3500 rpm, 3 min). The amount of wash water in the first centrifugation was equal to 90 mL/kg DS. The resulting mevalonolactone yield in centrifugation was 42%. The mevalonolactone purity of the centrifugation cake was ≥97% on DS, the water content of the non-dried cake was 14.7 wt. %, and the color was 33 ICUMSA. The mevalonolactone purity of the centrifugation mother liquor was 58% on DS and the color was 4200 ICUMSA.

The second centrifugation was carried out without wash water. The resulting mevalonolactone yield in centrifugation was 54%. The mevalonolactone purity of the centrifugation cake was ≥97% on DS, the water content of the non-dried cake was 11.7 wt. %, and the color was 120 ICUMSA. The mevalonolactone purity of the centrifugation mother liquor was 53% on DS and the color was 4600 ICUMSA.

Mevalonolactone monohydrate crystals prepared in accordance with this process were used as seed crystals in Examples 18 and 19. Before being used, the crystals were grinded in a porcelain mill.

Example 18

Water Solvent Crystallization of Mevalonolactone Monohydrate

This example describes the water solvent recrystallization of mevalonolactone monohydrate crystals dissolved in deionized water.

The crystallization feed material was an aqueous syrup comprising mevalonolactone. It was obtained by dissolving and diluting 2.2 kg of centrifugation cakes from Example 15 by adding deionized water. The mevalonolactone purity of the resulting syrup was 92% on DS and the color was 560 ICUMSA.

The feed syrup was evaporated to a DS of 80.8% (Rotavapor R-153 evaporator), and 2.3 kg of the resulting syrup was moved to a 2-liter cooling crystallizer. The syrup was cooled under continuous stirring without seeding in the following two steps: (1) from 20° C. to 15° C. within 2 hr and (2) from 15° C. to 10° C. within 10 hr. After cooling to 10° C., the stirring was continued at 10° C. for 6 hr. This did not result in any spontaneous crystal formation.

The syrup was seeded with 0.5 g of mevalonolactone monohydrate dry seed (prepared in accordance with Example 17) at a temperature of 10° C. The cooling water temperature in the crystallizer jacket was kept constant at 7° C. Crystal formation started immediately after seeding. The temperature of the crystal mass increased first from 10° C. to 16° C. within 50 min from seeding due to heat of crystallization and then decreased from 16° C. to 12° C. within 3 hr. After cooling to 12° C., the cooling water temperature was increased from 7° C. to 12° C., and the stirring was continued at 12° C. for 1 hr.

2.2 kg of the resulting crystal mass was centrifuged in 2 batches using an amount of wash water equal to 65-66 mL/kg mass DS (batch-wise centrifuge, basket diameter 22.5 cm, 3500 rpm, 3 min). A crystal cake sample and a mother liquor sample were collected from the first centrifugation. The mevalonolactone yield in the first centrifugation was 52%. The mevalonolactone purity of the first centrifugation cake was 298% on DS, the water content of the non-dried cake was 13.6 wt. %, and the color was 35 ICUMSA. The mevalonolactone purity of the first centrifugation mother liquor was 87% on DS and the color was 1100 ICUMSA.

Example 19

Water Solvent Crystallization of Mevalonolactone Monohydrate

This example describes the water solvent recrystallization of mevalonolactone monohydrate crystals dissolved in deionized water.

The crystallization feed material was an aqueous syrup comprising mevalonolactone. It was obtained by combining 2.0 kg of centrifugation cakes from Example 16 with 320 g of centrifugation cakes from Example 17. Before mixing, the mevalonolactone product from Example 16 was diluted with deionized water to a DS of 80.9%, and the resulting syrup was treated with active carbon in accordance with the procedure described in Example 6 (20 g of Norit DX 1 carbon powder per 1 kg of DS, contact time 1 hr, contact temperature 50° C., carbon powder separated by using Buchner filtration with Kenite 300 filter aid). The mevalonolactone purity of the crystallization feed syrup was ≥97% on DS and the color was 34 ICUMSA.

The feed syrup was evaporated to a DS of 78.3% (Rotavapor R-151 evaporator). 2.6 kg of the resulting syrup was moved to a 5-liter cooling crystallizer and seeded with 0.4 g of mevalonolactone monohydrate dry seed (prepared in accordance with Example 17) at a temperature of 17° C. The seeded syrup was kept at 17° C. for 1.5 hr and then cooled to a temperature of 13° C. within 15 hr under continuous stirring. After cooling to 13° C., the stirring was continued at 13° C. for hr.

2.4 kg of the resulting crystal mass was centrifuged in 2 batches using an amount of wash water equal to 65-71 mL/kg mass DS (batch-wise centrifuge, basket diameter 22.5 cm, 3500 rpm, 3 min). A crystal cake sample and a mother liquor sample were collected from the first centrifugation. The mevalonolactone yield in the first centrifugation was 50%. The mevalonolactone purity of the first centrifugation cake was 298% on DS, the water content of the non-dried cake was 12.1 wt. %, and the color was 3 ICUMSA. The mevalonolactone purity of the first centrifugation mother liquor was 96% on DS and the color was 70 ICUMSA.

Mevalonolactone monohydrate crystals prepared in accordance with this process were used as seed crystals in Example 20. Before being used, the crystals were grinded in a porcelain mill.

Example 20

Water Solvent Crystallization of Mevalonolactone Monohydrate

This example describes the water solvent crystallization of mevalonolactone monohydrate and the preparation of an aqueous, high-purity, mevalonolactone syrup.

The crystallization feed material was an aqueous syrup comprising mevalonolactone. It was obtained by combining the second centrifugation cake from Example 17 with the centrifugation mother liquors from Examples 18 and 19. The syrup was diluted to a DS of a 51.2% by adding deionized water, and the resulting solution was treated with active carbon in accordance with the procedure described in Example 6 (20 g of Norit DX 1 carbon powder per 1 kg of DS, contact time 1 hr, contact temperature 50° C., carbon powder separated by using Buchner filtration with Kenite 300 filter aid). The mevalonolactone purity of the resulting syrup was 93% on DS and the color was 170 ICUMSA.

The carbon treated feed syrup was evaporated to a DS of 80.3% (Rotavapor R-153 evaporator). 2.6 kg of the resulting syrup was moved to a 2-liter cooling crystallizer and seeded with 0.6 g of mevalonolactone monohydrate dry seed (prepared in accordance with Example 19) at a temperature of 18° C. The seeded syrup was kept at 18° C. for 1 hr and then cooled to a temperature of 13° C. within 15 hr under continuous stirring. After cooling to 13° C., the stirring was continued at 13° C. for 4 hr.

2.3 kg of the crystal mass was centrifuged in 2 batches using an amount of wash water equal to 67-68 mL/kg mass DS (batch-wise centrifuge, basket diameter 22.5 cm, 3500 rpm, 3 min). A crystal cake sample and a mother liquor sample were collected from the first centrifugation. The mevalonolactone yield in the first centrifugation was 51%. The mevalonolactone purity of the first centrifugation cake was ≥98% on DS, the water content of the non-dried cake was 12.3 wt. %, and the color was 3 ICUMSA. The mevalonolactone purity of the first centrifugation mother liquor was 87% on DS and the color was 370 ICUMSA.

DSC analysis of mevalonolactone monohydrate crystals prepared in accordance with this process resulted in an endothermic peak with a peak maximum at 22.6° C.

The centrifugation cakes were combined and diluted to a DS of 57.4% by adding deionized water to get liquid mevalonolactone product. The resulting syrup was evaporated to a DS of 297% (Rotavapor R-153 evaporator). The mevalonolactone purity of the evaporated syrup was ≥98% on DS, and the color was 2 ICUMSA.

Typical conditions for crystallizing MVL*H$_2$O are shown in Tables 13A-13E.

TABLE 13 A

Conditions for crystallizing MVL* H$_2$O with purity of feed between 50-100% of DS and between 55-99% of DS

|  | Min-Max | Preferably |
| --- | --- | --- |
| Feed purity (% DS) | 50-100 | 55-99 |
| Temperature (° C.) | 0-24 | 0-24 |
| DS content (%) | 65-95 | 70-88 |

TABLE 13 B

Conditions for crystallizing MVL* H$_2$O. Purity of feed between 55-70% of DS.

|  | Min-Max | Preferably |
| --- | --- | --- |
| Temperature (° C.) | 0-20 | 0-14 |
| DS content (%) | 82-95 | 84-88 |

TABLE 13 C

Conditions for crystallizing MVL* H$_2$O. Purity of feed between 70-80% of DS.

|  | Min-Max | Preferably |
| --- | --- | --- |
| Temperature (° C.) | 0-22 | 0-16 |
| DS content (%) | 79-94 | 81-88 |

TABLE 13 D

Conditions for crystallizing MVL* H$_2$O. Purity of feed between 80-93% of DS.

|  | Min-Max | Preferably |
| --- | --- | --- |
| Temperature (° C.) | 0-24 | 3-20 |
| DS content (%) | 72-90 | 74-86 |

TABLE 13 E

Conditions for crystallizing MVL* H$_2$O. Purity of feed between 93-98% of DS.

|  | Min-Max | Preferably |
| --- | --- | --- |
| Temperature (° C.) | 0-24 | 3-20 |
| DS content (%) | 65-90 | 70-86 |

In addition MVL*H$_2$O can be crystallized at temperatures below 0° C. down to the freezing point of the mother liquid if cooling equipment is capable and viscosity of the crystal mass is acceptable.

Example 21

Characterization of Mevalonolactone Monohydrate (MVL*H$_2$O)

Crystalline mevalonolactone monohydrate (MVL*H$_2$O) having the formula C$_6$H$_{10}$O$_3$*H$_2$O, was further characterized as described below.

A. X-Ray-Crystal Structure

X-ray diffraction of MVL*H$_2$O was measured.

B. Melting Point

The melting point (m.p.) of MVL-monohydrate (MVL*H$_2$O) was between 20-25° C., preferably 21-24. ° C. depending on the crystal purity. Crystallization is possible only below the m.p. The melting point is determined by using Differential Scanning Calorimeter (DSC) peak temperature. DSC thermogram was measured by using Mettler Toledo DSC822e differential scanning calorimeter. The measurement was run in standard 40 μL aluminum crucible in flowing nitrogen atmosphere with a flow rate of 80 mL/min. The temperature range was 0-50° C. and the heating rate was 2° C./min.

C. Crystalline Water Content

Theoretical water content of MVL-monohydrate is 12.15% (DS content 87.85%) when calculated from the molecular weights. (The molecular weight of MVL*H$_2$O is 148.16 g/mol). This corresponds with the crystals which are crystallized at the conditions having excess of water. If there is less water in the crystallization syrup than the crystal water content, the mother liquid is concentrating upon crystallization and crystalline water content of forming crystals become lower than theoretical. A crystalline water content of forming MVL-monohydrate crystals of 10.8% (by Karl-Fisher method) was observed as described in Example 13. A crystalline water content of forming MVL-monohydrate crystals of 10-11% was also observed for syrups having a high syrup DS (96 and 89).

D. Solubility in Water

Solubility is one property to characterize a crystalline compound. Crystallization is possible only above solubility concentration in supersaturated syrups. Solubility determines minimal DS concentration for the crystallization at given temperatures. The solubility is determined by standard methods like analyzing the equilibrium concentration from crystal suspension.

The MVL*H$_2$O solubility in water was determined by using crystals having a purity of 93%) and calculated to purity 100. Equilibrium DS contents were measured and calculated between 0-20° C. range (Table 14).

TABLE 14

| MVL*H$_2$O solubility | |
| --- | --- |
| Temperature (° C.) | solubility (% DS) |
| 0 | 43.9 |
| 4.8 | 52.3 |
| 9.8 | 61.2 |
| 15.0 | 70.6 |
| 20.0 | 79.7 |

E. Crystal Shape

Figure 3:
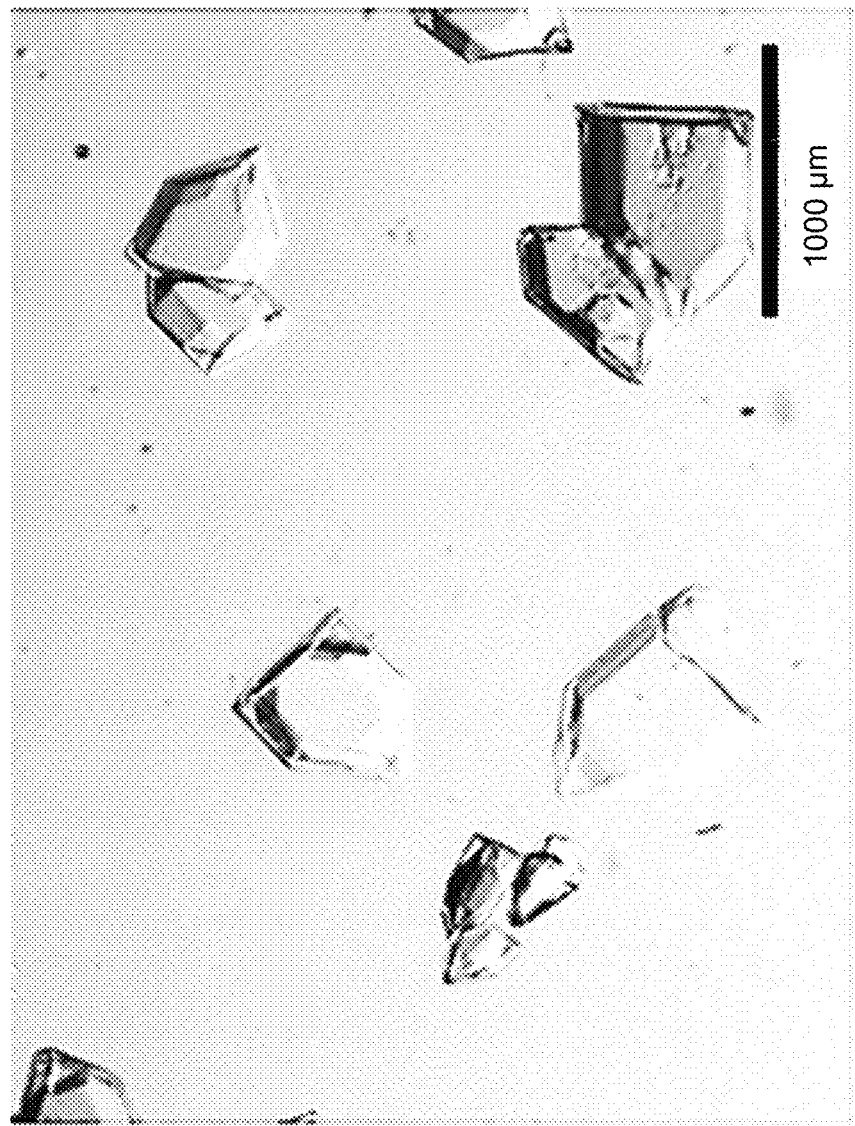
FIG. 3. This picture illustrates the typical shape of mevalonolactone*monohydrate (MVL*$H_2O$) crystals.

FIG. 3 illustrates the typical shape of mevalonolactone monohydrate (MVL*H$_2$O) crystals. Crystals easily grow large and fast and liberate lots of crystallization heat.

What is claimed is:

1. A method for producing a water solubilized mevalonolactone from an aqueous solution wherein the method comprises:
   a) producing a crystalline form of a salt of mevalonic acid (X-MVA) from an aqueous solution by subjecting the aqueous solution comprising said salt of mevalonic acid to a nanofiltration to produce a permeate and crystallizing said salt of mevalonic acid from said permeate by water solvent crystallization to produce crystals of said salt of mevalonic acid; and,
   b) dissolving the crystals of (a) in water to produce a water solubilized salt of mevalonic acid and subjecting said liquid to cation exchange thereby converting said water solubilized salt of mevalonic acid to water solubilized mevalonolactone.

2. The method of claim 1, wherein said salt of mevalonic acid salt is selected from the group consisting of Na-mevalonate (Na-MVA), K-mevalonate (K-MVA), ammonium mevalonate (NH$_4$-MVA), lithium-mevalonate (Li-MVA), any other monovalent salt of mevalonic acid, or any one combination thereof.

3. The method of claim 1, further comprising concentrating said water solubilized mevalonolactone (MVL), wherein said concentrated MVL has a purity of mevalonolactone of at least 90% (the percentage being the peak area corresponding to MVL relative to the total area of peaks using HPLC analysis).

4. A method for producing mevalonolactone monohydrate (MVL*H$_2$O) crystals, the method comprises:
   a) producing a crystalline form of a salt of mevalonic acid (X-MVA) from an aqueous solution by subjecting the aqueous solution comprising said salt of mevalonic acid to a nanofiltration to produce a permeate and crystallizing said salt of mevalonic acid from said permeate by water solvent crystallization to produce crystals of said salt of mevalonic acid;
   b) dissolving the crystals of (a) in water to produce a water solubilized salt of mevalonic acid and subjecting said liquid to cation exchange thereby converting said water solubilized salt of mevalonic acid to water solubilized mevalonolactone; and,
   c) cooling said water solubilized mevalonolactone at 0-25° C. to obtain mevalonolactone monohydrate (MVL*H$_2$O) crystals.

5. The method of claim 4, further comprising dissolving said MVL*H$_2$O crystals into water to obtain a dilute liquid comprising mevalonolactone having a purity of mevalonolactone of least 90%.

* * * * *